United States Patent [19]

Oku et al.

[11] Patent Number: 5,675,745
[45] Date of Patent: Oct. 7, 1997

[54] CONSTRUCTING METHOD OF ORGANIZATION ACTIVITY DATABASE, ANALYSIS SHEET USED THEREIN, AND ORGANIZATION ACTIVITY MANAGEMENT SYSTEM

[75] Inventors: Masayoshi Oku, Oita; Shigeki Kusaba, Kawasaki, both of Japan

[73] Assignee: Fujitsu Limited, Kawasaki, Japan

[21] Appl. No.: 598,650

[22] Filed: Feb. 8, 1996

[30] Foreign Application Priority Data

Feb. 13, 1995 [JP] Japan .................................. 7-024438
Feb. 2, 1996 [JP] Japan .................................. 8-017631

[51] Int. Cl.⁶ .......................... G06F 17/30; G06F 17/60
[52] U.S. Cl. .......................... 395/207; 395/613; 395/614; 395/615; 395/201
[58] Field of Search .......................... 395/201, 207, 395/613–615, 925

[56] References Cited

U.S. PATENT DOCUMENTS 5,179,698  1/1993  Bachman et al. .................... 395/604
5,233,513  8/1993  Doyle ................................ 395/207
5,241,645  8/1993  Cimral et al. ..................... 395/500
5,249,300  9/1993  Bachman et al. ................... 395/800
5,331,545  7/1994  Yajima et al. ..................... 395/208
5,581,691  12/1996 Hsu et al. ....................... 395/182.13

Primary Examiner—Paul V. Kulik
Attorney, Agent, or Firm—Staas & Halsey

[57] ABSTRACT

By collecting or creating information written in a specific descriptive system, making a real model defining the concept handled in the organization activity, analyzing the domain for defining the words by stratifying each concept on the model of each basic concept of at least person, organization, article, document, meeting and event for composing the organization activity, analyzing the sentence pattern for defining the context by stratifying on the model of the concept of action, and by fitting and integrating the word defined by domain analysis and sentence pattern analysis into the context, a logical model corresponding to the real model is created. Thereby an organization activity database, in which information about various events necessary for organization activity and information of achievements resulting organization activity are integrated, is constructed.

6 Claims, 66 Drawing Sheets

FIG. 7

| classifying by mutual relation | higher and lower classes | high and low relation | higher concept | (higher) |
|---|---|---|---|---|
| | | | lower concept | (lower) |
| | | | same rank concept | (same rank) |
| | | dividability | simple concept | (undividable) |
| | | | complex concept | (dividable) |
| | between same class | same class | same concept | (same connotation) |
| | | | equal concept | (different connotation) |
| | | cross concept | relative concept | (depending each other) |
| | | (part of class overlapping) | other concepts | |
| | | disjunctive concept | contradictory concept | (denying each other) |
| | | (no overlap among class) | opposite concept | (intermediate is exist) |
| classifying by element number | one element | single concept | other concepts | |
| | plural element | general concept | set concept | (applied to set) |
| | | | individual concept | (applied to element) |

FIG. 10

| PUT | Example |
|---|---|
| 1 | (person) put (person, creature, vehicle, article) into (place) (from (place)) |
| 2 | (person) put (article) into (place) (from (place)) |
| 3 | (person, org.) put (person) into (group, org.) |
| 4 | (person, org.) put (person, article, event) into (class) |
| 5 | (person, org.) put (machine, equipment) into (place) |
| 6 | (person) put (switch, fire) |
| 7 | (person, org.) put (money, notice) into (person, org.) |
| 8 | (person) put (article) into (article) |
| 9 | (person) put (article) into (thought) |
| 10 | (person) put (feeling) into (event) |
| 11 | (person) put (drawing) into (article, event) |
| 12 | (person) put (edge tool) into (article, place) |
| 13 | (person) put (vote) into (person, article, event) |
| 14 | (person, org.) put (thought, request) |

FIG. 11A

| Classification of model | Written material from which model is abstracted | Information to be collected |
|---|---|---|
| Relation of org. and person *assigned to org. | organization chart | *assignment relation of person and organization Ex. member of development dept. < development dept. *Relation of manager of org. and org. Ex. Head of dept. < dept. *Relation of manager and person covering work within org. *Relation of managers by hierarchy of organizations |
| Role relation | Job manual | *role relation among persons |
| Blood relation | Family tree | *relation of parent and child *marital relation |
| Marital relation | Family register | *relation of parent and child *marital relation |

FIG. 11B

| Business relation | Document of business relation: indenture | Not handled in org. model |
|---|---|---|
| Contract relation | indenture, memorandum | Not handled in org. model |
| Cooperation relation | Document of business cooperation: indenture, memorandum | Not handled in org. model |
| Possessive relation | Possession of fixed assets :fixed assets cadaster | Not handled in org. model |
| Relation of action | Job manual | Not handled in org. model |

FIG. 12

PERSON SHEET

| Written Item | Note | Example |
|---|---|---|
| Person No. | Write sequential No. in person sheet | |
| Name of person | Write role name | Chief of XX |
| Assignment Name of person | Write org. name to which person is assigned | YY dept. |
| Role | Write role name, post to which person covers | Head of dept. |

PERSONNEL SHEET

| Written Item | Note | Example |
|---|---|---|
| Parent | Write parent of person | |
| Spouse | Spouse of person | |

FIG. 13

| Classification of model | Written material from which model is abstracted | Information to be collected |
|---|---|---|
| Relation of org. and org. Assignment relation (hierarchy) | organization chart | *org. name<br>Ex. development dept.<br>*assigned relation of org.<br>Ex. development dept.< development H.Q. |
| Business relation | Document of business relation: indenture | Not handled in org. model |
| Contract relation | indenture, memorandum | Not handled in org. model |
| Cooperation relation | Document of business cooperation: indenture, memorandum | Not handled in org. model |
| Possessive relation | Possession of fixed assets :fixed assets cadaster | Not handled in org. model |
| Relation of action | Job manual | Not handled in org. model |

FIG. 14

| Written Item | Note | Example |
|---|---|---|
| Company name | Write company name | |
| Dept. name 1 | Write organization of company | |
| Dept. name 2 | Write organization of company | |
| Dept. name 3 | Write organization of company | |
| Dept. name 4 | Write organization of company | |
| Dept. name 7 | Write organization of company | |
| Dept. name 8 | Write organization of company | |

FIG. 15

| Classification of model | Written material from which model is abstracted | Information to be collected |
|---|---|---|
| Combination relation | Specification of product | *article name<br>*combination relation |
| Parts relation | In case of office supplies Specification. of product, Catalogue<br>In case of industrial products: bill of materials | *article name<br>*article relation |
| Set relation<br>*driver-screw<br>*speaker-amp. | Sales slip (when articles sold in set relation)<br><br>Manual (find description used with other commodity) | *article name<br><br>*set relation |
| Relation of material and product | Manufacturing direction | *article name<br>*relation of material and production |
| Possession relation | | *relation of article and person, organization who possesses it |

FIG. 16

| Written Item | Note | Example |
|---|---|---|
| Article No. | Write sequential No. in article sheet | |
| Article Name | Write real article name | |
| Article abbreviation name | Write abbreviation name used in job | |
| Component | Write component article | |
| Material | Write material | |
| Set using | Write article which used combined | |
| Possessor | Write person or organization of possessor | |

FIG. 17

| ACTION NAME | INFORMATION TO BE COLLECTED | Ex. |
|---|---|---|
| XXX WORK | Subjective case | Subject of action<br>Ex. person, development dept. |
| | Objective case | Object of action<br>Ex. development dept. person |
| | Source case | Source of action<br>Ex. person |
| | Partner case | Partner of action<br>Ex. person organization |
| | Appliance case | Appliance, means of action<br>Ex. action meeting |
| | Place case(at) | In case of performed at one place Ex. Tokyo, place |
| | Place case(from) | In case of performed moving two places Ex. Osaka place |
| | Place case(to) | Ex. Tokyo, place |
| | Document of request source | Document which requests the work Ex. input request sheet |
| | Document to be written | In case of writing new document Ex. input request sheet |
| | Document to be added | In case of adding information to written document<br>Ex. Schedule |
| | Document to be referred | There are following two cases<br>1) Document to be referred at action<br>2) Document to be referred at writing document |
| | Prior action | Action to be done before this work |
| | Prior condition | Executing condition of this action |

FIG. 18A

| MEANING | SENTENCE PATTERN |
|---|---|
| Naming | [Concept 1] V [Concept 4] as [Concept 3] to [Concept 2] |
| Limiting | [Concept 1] V [Concept 2] to [Concept 3] |
| Installing | [Concept 1] V [Concept 2] at [Concept 3] |
| Adding | [Concept 1] V [Concept 2] to [Concept 3] |
| Varying | [Concept 1] V [Concept 2] to [Concept 3] |
| Obtaining | [Concept 1] V [Concept 4] from [Concept 3] |

| Verb | Subjective case | Objective case | Source case |
|---|---|---|---|
| to write | Statistics Dept. | Dispatch | |
| to decide | Statistics Dept. | Project | |
| to deliver | Statistics Dept. | Check spec. | |
| to put in | Statistics Dept. | Input spec. | |
| to return | Statistics Dept. | List making report | |
| to receive | Statistics Dept. | Input spec. | |

FIG. 18B

| Target case | Partner case | Appliance case |
|---|---|---|
| Person covering theme | | |
| person, article, event | Person covering analysis | |
| | | |
| | | |
| Leader for preparation | | |
| | | |

| Appliance case | Place case | Time case |
|---|---|---|
| | | |
| | | |
| Place | Place | |
| Place | Box of covering person | |
| Place | | |
| | | |

FIG. 19

| Name of meeting | Information to be collected | Example |
|---|---|---|
| XX committee | Organizer (chairman) | Who organizes meeting (Ex. Head of development dept, person) |
| | Secretariat | Persons of secretariat who set meeting (Ex. development dept, person) |
| | Member (chairman) | Persons who joint meeting (Ex. Head of development dept, person) |
| | Place | Place where meeting is opened (Ex. Tokyo branch, place) |
| | Time | (Ex. Every half month) |
| | Prior work | Preparation and procedure for opening meeting (Ex. Writing document, action) |
| | After work | Work after meeting (Ex. writing minute book, action) |
| | Purpose | Corresponding to "objective case" of action model |
| | Referred document | Document to be referred at meeting (document) |
| | Prior action | Action to be performed before meeting, information for deciding sequence (Ex. YY process, action) |
| | Prior condition | Execution condition of meeting |

FIG. 20

| WRITTEN ITEM | NOTE |
|---|---|
| Meeting No. | Write Sequential No. in meeting sheet |
| Meeting name | Write meeting name |
| Organizer | Write person name organizing meeting |
| Secretariat | Write secretariat name which sets meeting |
| Member | Write names of persons who joint meeting |
| Place | Write place where meeting is opened |
| Time | Write timing when meeting is opened |
| Purpose | Corresponding to "objective case" of action model |
| Ref. document | Write document name referred at meeting |
| Prior action | Write action to be performed before meeting |
| Prior condition | Write condition of execution of meeting |

FIG. 21

| Classification of model | Written material from which model is abstracted | Information to be collected |
|---|---|---|
| Document as information model | List of personal name<br>  Ex. Employee master<br>      Doctor master<br>List of org. name<br>  Ex. Organization chart<br>List of article name<br>  Ex. Medicine master<br>Document of action<br>  Ex. Report<br>Document of meeting<br>  Ex. Minute book | *document name and data item |
| Document as article | Abstracting information relating to making, using, updating, keeping, scrapping of document from description of job manual | *At making<br>   document<br>   writer<br>   date<br>*From keeping<br>   standard<br>   period<br>are abstracted |

FIG. 22

DOCUMENT NAME SHEET

| Information to be collected | Note | Example |
|---|---|---|
| Document No. | Document No. of samples | |
| Document name | Real document name used in job | |
| Source | | |

ITEM NAME SHEET

| Information to be collected | Note | Example |
|---|---|---|
| Document No. | Document No. of samples | |
| Document name | Real document name used in job | |
| Item name | Write item name in document | |
| Remarks | Real document name used in job | |
| Source | | |

FIG. 23

| DOCUMENT No. | DOCUMENT NAME | SOURCE |
|---|---|---|
| A018 | List of Doctor covering clinical trial | Management system plan of clinical trial medicines |
| A019 | List of Doctors | Management system plan of clinical trial medicines |
| B002 | Application of requesting clinical trial | development dept. SOP |
| B003 | Application of commisson of supervising Doctor covering clinical trial | development dept. SOP |
| B004 | Acceptance of supervising Doctor covering clinical trial | development dept. SOP |
| B017 | Resultant report of examination of clinical trial | development dept. SOP |
| B018 | Notice of execution of clinical trial | development dept. SOP |

FIG. 24

| Classification of model | Written material from which model is abstracted | Information to be collected |
|---|---|---|
| Event as information model<br>*is-a relation<br>*Whole-part relation<br>*Coupling relation | | *event name |

FIG. 25

| WRITTEN ITEM | NOTE | Example |
|---|---|---|
| Event manage management No. | No. given uniquely to each event | |
| Event name | Event name written in work name sheet | Theme |

FIG. 26A

| WRITTEN ITEM | |
|---|---|
| Page No. | Write page No. of job manual (Ex.:A0042A) |
| Job name | Write large process written in job manual |
| Process name | Write middle process written in job manual |
| Name of dept on duty | Write name of dept. which covers this work |
| Work No. | Write page No. and sequential No. in this sheet (Ex.:A0042A-01) |
| Work name | Write work description in job manual intact |
| Verb | Write verb abstracted from work name |
| Sentence pattern | Write sentence pattern of the verb |
| Doer case | Write person or org. to be subject of action |
| Concept of doer | Select above concept |
| Objective case | Write concept to be object of action |
| Concept of object | Select above concept |
| Source case | Write concept to be source of action |
| Concept of source | Select above concept |
| Target case | Write concept to be target of action |
| Concept of target | Select above concept |

FIG. 26B

| | |
|---|---|
| Partner case | Write concept to be partner |
| Concept of partner | Select above concept |
| Appliance case | Write concept to be appliance of action |
| Concept of appliance | Select above concept |
| Place case (at) | Written place of action (performed at one place) |
| Place case (from) | Written place of action (source performd at two place |
| Place case (to) | Written place of action (terminate point performed at two places) |
| Document of source | Write document name of request source or instruction |
| Written document | Write document name newly made by this work |
| Postscript document | In case postscript is done to written document |
| Ref. document | Write document name to be referred at doing this work |
| Prior work | Write work No. to be done before this work |
| Prior condition | Write "in case" when this work is to be done in specific condition |

FIG. 28

| ORG. ACT. ANALYSIS ▶ | ACTION SHEET |
|---|---|
| ORG. ACT. ANALYSIS SYSTEM | |

ACTION SHEET

ACTION No. CL-13-01-1-C16-1

SENTENCE

VERB  TO PRESENT

SENTENCE PATTERN  [PERSON] V [DOCUMENT] TO [PERSON]

DOER CASE  ☒ PERSON COVERING DEVELOPMENT  PERSON

SUBJECT CASE  ☒ DATA ANALYSIS REQUESTING PAPER  DOCUMENT

START CASE  ☐

OBJECT CASE  ☒ PERSON COVERING ANALYSIS

COMMON CASE  ☐

APPLIANCE CASE  ☐

PLACE CASE  ☐

TIME CASE  ☐

PERSON
ORG.
DOCUMENT
ARTICLE
MEETING
EVENT

DOMAIN ANALYSIS
SENTENCE PATTERN ANALYSIS
DISP. LOGICAL MODEL

END

FIG. 30

ORG. ACT. ANALYSIS

ORG. ACT. ANALYSIS SYSTEM

DOMAIN ANALYSIS

SENTENCE PATTERN ANALYSIS

DOMAIN ANALYSIS

SPECIFY DOMAIN

○ PERSON  ○ ORG.
⦿ DOCUMENT ○ ARTICLE
○ MEETING ○ EVENT

[ OPEN ]   [ CAN. ]

DOCUMENT SHEET

DOCUMENT SHEET

Specify following items.

DOCUMENT No.     5005
DOCUMENT NAME   PROJECT MANAGEMENT CHART
DOCUMENT TYPE
SOURCE           DEVELOP DEPT. SOP

Specify written items.

| ITEM | NOTE |
|------|------|
| ▲ TEL |  |
| PHASE |  |
| PROJECT |  |
| COMPANY NAME |  |

FIG. 31

PERSON SHEET

PERSON SHEET

MAN No. R0021
NAME OF PERSON DOC. COVERING CLINICAL TRIAL

ORG.
| ORG. No. | ORG. NAME |
| --- | --- |
| 00386 | MEDICAL INSTITUTION |
| 00389 | CLINICAL TRIAL REQUESTING INSTITUTION |

ROLE
| MAN No. | ROLE NAME |
| --- | --- |
| R0024 | DOC. COVERING WRITING |
| R0127 | CLINICAL TRIAL APPRAISER |

ORG. ACT. ANALYSIS
ORG. ACT. ANALYSIS SYSTEM

DOMAIN ANALYSIS
SENTENCE PATTERN ANALYSIS

DOMAIN ANALYSIS
SPECIFY DOMAIN

⊙ PERSON  ○ ORG.
○ DOCUMENT  ○ ARTICLE
○ MEETING  ○ EVENT

OPEN   CAN.

FIG. 34

MEETING SHEET

| | |
|---|---|
| MEETING No. | N0002 |
| MEETING NAME | CLINICAL TRIAL EXECUTION COMMITTEE |
| ORGANIZER | |
| MEMBER | |
| PLACE | |
| CYCLE | HALF-MONTHLY |
| MEETING OBJECT | |
| REF. DOCUMENT | No.  NAME |
| PRE-ACTION | ACTION No.  ACTION NAME |

ORG. ACT. ANALYSIS

ORG. ACT. ANALYSIS SYSTEM
DOMAIN ANALYSIS
SENTENCE PATTERN ANALYSIS

DOMAIN ANALYSIS

SPECIFY DOMAIN

○ PERSON  ○ ORG.
○ DOCUMENT ○ ARTICLE
⦿ MEETING ○ EVENT

OPEN   CAN.

FIG. 35

ARTICLE SHEET

| ART. No. | T0027 |
| --- | --- |
| ART. NAME | CLINICAL TRIAL MEDICINE |

PARTS RELATION

| ART. No. | ART. NAME |
| --- | --- |
| T0038 | INNER BAG |
| T0048 | PACKING MATERIAL |

SET RELATION

| ART. No. | ART. NAME |
| --- | --- |
|  |  |

PARTS RELATION

| ART. No. | ART. NAME |
| --- | --- |
|  |  |

POSSESSOR

| POSSESSOR No. | POSSESSOR NAME |  |
| --- | --- | --- |
|  |  | ○ PERSON<br>○ ORG. |

---

ORG. ACT. ANALYSIS

ORG. ACT. ANALYSIS SYSTEM

DOMAIN ANALYSIS | SENTENCE PATTERN ANALYSIS

DOMAIN ANALYSIS

SPECIFY DOMAIN

○ PERSON   ○ ORG.
○ DOCUMENT ⊙ ARTICLE
○ MEETING  ○ EVENT

[ OPEN ]   [ CAN. ]

FIG. 40

| SENTENCE PATTERN | ACTION | PERSON (WHO) | DOCUMENT (WHAT) | OTHER FOUR CONCEPTS |
|---|---|---|---|---|
| [ ]do[ ] | TO PROVIDE | BUSINESS TRIPPER | SETTLEMENT ACCOUNT | |
| | | DEVELOPER | PATENT APPLICATION | |
| | TO CREAT | DEVELOPER | DESIGN DOCUMENTATION | |

FIG. 45

```
┌─────────────────────────────────────────┐
│               SELECT                    │
├─────────────────────────────────────────┤
│                                         │
│   RETRIEVE                              │
│   DATA BASE                             │
│                                         │
│   ┌───────────┐                         │
│   │THEME NAME │  _____    │
│   └───────────┘                         │
│                                         │
│   ┌───────────┐                         │
│   │CLINICAL   │  _____    │
│   │TRIAL NAME │                         │
│   └───────────┘                         │
│                                         │
│   ┌───────────┐                         │
│   │WORK GROUP │  _____    │
│   │NAME       │                         │
│   └───────────┘                         │
│                                         │
│   ┌───────────┐                         │
│   │WORK NAME  │  _____    │
│   └───────────┘                         │
│                                         │
│                      ┌─────┐  ┌──────┐  │
│                      │EXE. │  │CLOSE │  │
│                      └─────┘  └──────┘  │
└─────────────────────────────────────────┘
```

FIG. 47

```
┌─────────────────────────────────────────────┐
│           CLINICAL TRIAL LIST               │
├─────────────────────────────────────────────┤
│                                             │
│   THEME NAME:  │       AB999       │        │
│                                             │
│  ┌───────────────────────────────────┬───┐  │
│  │ CLINICAL PHARMACOLOGY TRIAL       │ ↑ │  │
│  │ CLINICAL PHARMACOLOGY TRIAL PLAN  │   │  │
│  │ INJECTION AGENT CLINICAL THIRD    │   │  │
│  │ PHASE TRIAL (DBT)                 │   │  │
│  │ CLINICAL THIRD PHASE TRIAL        │   │  │
│  │              .                    │   │  │
│  │              .                    │   │  │
│  │              .                    │   │  │
│  │              .                    │   │  │
│  │                                   │   │  │
│  │                                   │   │  │
│  │                                   │ ↓ │  │
│  └───────────────────────────────────┴───┘  │
│                                             │
│                  │WORK GROUP│  │ CLOSE │    │
│                  │LIST      │              │
└─────────────────────────────────────────────┘
```

FIG. 48

```
┌─────────────────────────────────────────────┐
│             WORK GROUP LIST                 │
├─────────────────────────────────────────────┤
│                                             │
│   THEME NAME:  │      AB999       │         │
│                                             │
│   CLINICAL     │ INJECTION AGENT CLINICAL │  │
│   TRIAL NAME:  │ THIRD PHASE TRIAL(DBT)   │  │
│                                             │
│  ┌───────────────────────────────────────┐  │
│  │ INTERMEDIATE EXAMINATION           ↑ │  │
│  │ MONITORING OF CLINICAL TRIAL         │  │
│  │ SYMPTOMS EXAMPLE EXAMINATION         │  │
│  │ DATA FIX                             │  │
│  │ KEY-OPEN MEETING                     │  │
│  │ CLINICAL TRIAL REPORT PRESENTING     │  │
│  │ AFTER TWO WEEKS FROM CLINICAL TRIAL  │  │
│  │ REPORT PRESENTING                    │  │
│  │ MODIFICATION PRESENTING              │  │
│  │                                      │  │
│  │              ·                       │  │
│  │              ·                       │  │
│  │              ·                       │  │
│  │                                    ↓ │  │
│  └───────────────────────────────────────┘  │
│                                             │
│                    │ WORK LIST │  │ CLOSE │ │
└─────────────────────────────────────────────┘
```

FIG. 49

```
┌─────────────────────────────────────────────┐
│                  WORK LIST                   │
├─────────────────────────────────────────────┤
│                                              │
│   THEME NAME:    ┌──────────────────────┐   │
│                  │        AB999         │   │
│                  └──────────────────────┘   │
│                                              │
│   CLINICAL       ┌──────────────────────┐   │
│   TRIAL NAME:    │ INJECTION AGENT CLINICAL │
│                  │ THIRD PHASE TRIAL(DBT)   │
│                  └──────────────────────┘   │
│                                              │
│   WORK GROUP     ┌──────────────────────┐   │
│   NAME:          │ CLINICAL TRIAL REPORT│   │
│                  │ PRESENTING           │   │
│                  └──────────────────────┘   │
│                                              │
│   ┌──────────────────────────────────────┐  │
│   │ MAKING CLINICAL TRIAL REPORT         │  │
│   │ CONFIRMING CLINCAL TRIAL REPORT      │  │
│   │ STAMP PROCEDURE OF CLINICAL          │  │
│   │ TRIAL REPORT                         │  │
│   │ FIANL CONFIRMING CLINICAL            │  │
│   │ TRIAL REPORT                         │  │
│   │ PRESENTING CLINICAL TRIAL REPORT     │  │
│   └──────────────────────────────────────┘  │
│                                              │
│                               ┌─────────┐   │
│                               │  CLOSE  │   │
│                               └─────────┘   │
└─────────────────────────────────────────────┘
```

FIG. 53

| CLINICAL TRIAL PROJECT PRESENTING EXECUTION ||
|---|---|
| 1 In case of clinical trial of new effective component,··· ||
| 2 When the effective component is already approval,··· ||

| CLINICAL TRIAL PROJECT PRESENTING ||
|---|---|
| NAME AND PLACE OF MANUFACTORY | |
| COMPONENT AND DOSE | |
| PROCESS | |
| ⋮ | |

FIG. 54

WORK MANAGEMENT

| | | |
|---|---|---|
| WORK NAME | MAKING CLINICAL TRIAL REPORT | |
| WORK CODE | AB-06-00-2-B02 | |
| PREARRANGED PERSON ON DUTY | ○○ ○○ | PERSON ON DUTY ○○ ○○ |
| PREARRANGED START DATE | 92/04/09 | START DATE 92/04/09 |
| PREARRANGED FINISH DATE | 92/04/13 | FINISH DATE 92/04/13 |
| UPDATE DOCUMENT | | |
| WRITTEN DOCUMENT | SUMMARY | |

EX-WORK 0/0 < >
NEXT WORK 1/1 < >

CLOSE

| PERSONAL INFORMATION | |
|---|---|
| MAN CODE | 1234 |
| NAME | ○○ ○○ |
| SEX | MALE |
| PLACE OF DUTY | DEVELOPMENT DEP. |
| ATTATCHED DATE | 94/06/21 |
| ENTERING DATE | 92/04/01 |
| FINAL ACADEMIC CAREER | O× UNIVERSITY |
| ADDRESS | 1-2-3, ××CYTY |
| TELL. | |

CAREER

93/12/21 ▼

- 94/06/21
- 93/12/21
- 93/07/21
- 93/04/01
- 92/10/08

[ RESET ]   [ CLOSE ]

FIG. 57

| PERSONAL INFORMATION | |
|---|---|
| MAN CODE | 1234 |
| NAME | ○○ ○○ |
| SEX | MALE |
| PLACE OF DUTY | DEVELOPMENT DEP. |
| ATTATCHED DATE | 94/06/21 |
| ENTERING DATE | 92/04/01 |
| FINAL ACADEMIC CAREER | O× UNIVERSITY |
| ADDRESS | 1-2-3,××CYTY |
| TELL. | |

CAREER
93/12/21 ▼    RESET    CLOSE

FIG. 58

```
┌─────────────────────────────────────┐
│              SELECT                 │
├─────────────────────────────────────┤
│                                     │
│   RETRIEVE DATABASE                 │
│                                     │
│   ┌───────────┐                     │
│   │THEME NAME │  _____  │
│   └───────────┘                     │
│     ┌────────┐                      │
│     │ REPORT │    _____ │
│     └────────┘                      │
│   ┌──────────┐                      │
│   │ DOCUMENT │    _____ │
│   │  TYPE    │                      │
│   └──────────┘                      │
│                                     │
│                  ┌──────┐  ┌───────┐│
│                  │ EXE. │  │ CLOSE ││
│                  └──────┘  └───────┘│
│                                     │
└─────────────────────────────────────┘
```

FIG. 60

| DOCUMENT LIST |
|---|

| 8 ANALYSIS REPORT | 1st EDIT. |
| 9 SYMPTOMS LIST | 1st EDIT. |
| 11 ANALYSIS REPORT | 2nd EDIT. |

[DOCUMENT] [DEPENDING] [RET.] [CLOSE]

FIG. 62

| INFORMATION RELATED DOCUMENT | |
|---|---|
| THEME | AB999 |
| REPORT | |
| DOCUMENT ID | 11 |
| DOCUMENT NAME | ANALYSIS REPORT |
| VERSON | 2 |
| UPDATE | 94/06/15 |
| WRITER | ○○ ○○ |

CAREER
94/06/21 ▼

CLOSE

FIG. 63

| | PERSONAL INFORMATION | |
|---|---|---|
| MAN CODE | 1234 | |
| NAME | ○○ ○○ | |
| SEX | MALE | |
| PLACE OF DUTY | DEVELOPMENT DEP. | |
| ATTATCHED DATE | 94/06/21 | |
| ENTERING DATE | 92/04/01 | |
| FINAL ACADEMIC CAREER | O× UNIVERSITY | |
| ADDRESS | 1-2-3,××CYTY | |
| TELL. | | |
| CAREER 93/12/21 ▼ | RESET | CLOSE |

CONSTRUCTING METHOD OF ORGANIZATION ACTIVITY DATABASE, ANALYSIS SHEET USED THEREIN, AND ORGANIZATION ACTIVITY MANAGEMENT SYSTEM

BACKGROUND OF THE INVENTION

1. Field of the Invention

The present invention relates to a constructing method of organization activity database integrating information about various events necessary for organization analyzing or achievements and other information generating therefrom, and analysis sheet and organization activity management system used in the same.

More particularly, the invention relates to a constructing method of organization activity database for registering various pieces of information generated in the process of various organization activities based on the result of taking in and analyzing events in consideration of process (work flow) management, organization internal rules, statutory regulations and the like in various organization activities, an analysis sheet used therein, and an organization activity management system capable of understanding the working condition from the physical aspect, searching next process, and searching related organization, document or personal information, by integrating thus constructed object-oriented database (OODB) and conventional relational database (RDB).

2. Description of the Related Art

In many organizations, especially enterprises, hitherto, computer systems have been introduced for the purpose of promoting the efficiency and automation of data processing in order to enhance the productivity of objects. Such introduction of computer system contributed greatly to efficiency and automation of general routine tasks, such as processing of slips, but was not sufficiently effective in many non-routine tasks, for example, research and development, and further in the enhancement of productivity of clerical processing in the enterprise.

Recently, in the organization activity, especially in the enterprise activity aiming at profit making, the concept called "work flow" is attracting attention. The work flow is generally defined as the "process promoted by integrating individual tasks in order to achieve transactions (individual processes defined clearly) within an organization".

Transactions consist of routine tasks that occur every day and can be processed by standard procedure, and non-routine tasks that do not occur every day and are processed individually. The former includes slip processing and other tasks occurring in daily enterprise activities, and is called production work flow. The latter includes research and development and the like, and is called ad hoc work flow.

The conventional computer software for management of production work flow includes various types of software for automating frequent, repetitive and important jobs for the enterprise, such as insurance billing and payment settlement. However, nothing notable is available at the present as the computer software for management of ad hoc work flow. This is because, considering the computer software for ad hoc work flow, necessary process for given job is not determined, and processing is often done by judgment of individual persons.

On the other hand, when classifying the work flow aside from the classification into production work flow and ad hoc work flow a classification into document-oriented work flow and group-oriented work flow may be considered. In document-oriented jobs, required processes are mainly carried out by papers or a work package called folder containing them. In other words, in the document-oriented work flow, one document or folder is put into a queue composed of plural workers, and is sequentially processed to promote the task. By contrast, in the group-oriented work flow, jobs are instructed to individual workers, and jobs executed by individual workers are integrated, and by repeating such work, one task is executed by plural workers.

In this way, the work flow is roughly classified into four categories, that is, the document-oriented production work flow, document-oriented ad hoc work flow group-oriented production work flow, and group-oriented ad hoc work flow.

Incidentally, for the management of document-oriented work flow, an art called SGML (Standard Generalized Markup Language) is known. It was established as ISO8879 in 1986, and it is a computer language for handling documents electronically, that is, in a format handled by computer. This system has been already employed in the Patent Office of Japan.

Moreover, as a subset of SGML, HTML (HyperText Markup Language) is also known for handling documents including multimedia data such as voice and moving image. The hypertext is the software enabling to handle data such as characters, image and voice as the object, and access by linking them variously, and its descriptive language is the HTML. A file in the HTML format can be linked with video and audio data, and not only the pure text data, but also drawings, receipts and others can be directly taken in as image data in bit map format or the like, so that the so-called multimedia system can be constructed.

The concept of SGML may be summarized as follows.

*Elements of a document are classified into structure and content, and appearance elements.

*The document structure and information content are expressed by SGML, and shown by standard characters.

*The document structure is defined by language, without sacrificing the flexibility of document.

Having such concept, the SGML provides the following features.

*The writer of the document can concentrate efforts on writing the document accurately and simply. That is, the writer need not consider the layout of document that was required conventionally in the word processor or DTP (desktop publishing) system.

*The document can be written by using any preferred word processor or editor (text editor), and it is possible to print or display without changing the document content. As a result, the document making and output are not limited by specific appliance or system.

*In particular, in the case of in-house documents, official documents, or commercial documents such as manuals, it is easy to standardize the style of the documents.

*The documented information can be easily made into database.

*By using HTML, the document can be made easily by using not only text data, but also still picture, moving picture and sound.

In the enterprise activities, on the other hand the standard of quality management established as ISO9000 in 1987 is known. In this ISO9000, "the procedure for making up the product quality" is more important than "the product quality itself", and it requires "documentation of quality system (quality making procedure) conforming to the quality policy of the top management, and assortment of documents proving that the jobs are done exactly according to the procedure specified in these documents".

To realize such ISO9000, it is necessary to make and store necessary documents, and it is very effective, needless to say, to make these documents in a standardized descriptive system, for example, SGML, from the viewpoint of database compilation.

To record various informations in an organization (enterprise) in an electronic format, that is, to form into electronic data such as text data and document descriptive data for the document to be processed by a word processor, graphic data to be processed by CAD/CAM system, and raster data for photographs and graphics, it means evidently that a further efficiency is achieved because various documents (documents, drawings, business transaction slips, etc.) in all departments of the enterprise such as design department, sales department, manufacturing department and distribution department can be exchanged easily as electronic information through communication lines. More specifically, the drawings made by the CAD in the design department can be instantly transmitted to the manufacturing department or distribution department, and hence it is possible to respond very quickly relation to the manufacturing equipment, or from the viewpoint of problems in procurement of parts and feedback of market research.

Considering from such technical flow, evidently, further efficiency is demanded in contact with other organizations, aside from the efficiency of organization activity within one organization. That is, by exchanging various documents (documents, drawings, business transaction slips, etc.) with other organizations (other companies) as electronic information through communication lines, it is obvious that a further efficiency is achieved. More specifically, for example, drawing data made by the CAD of one company is sent to a component manufacturing company through communication lines, and the data can be directly put into an NC machine, so that manufacture of the component can be started immediately.

Such technique is realized, however, only by standardization of electronic information, not only within one organization, but also on a global scale at the present. For example, when the electronic information is standardized within one company and electronic information can be exchanged between the design department and manufacturing department, however, when subcontracting the components, the drawings must be printed as hard copy and submitted to the subcontractor. In this case, the subcontractor is not limited within the nation, and therefore a global standardization of electronic information is needed.

Such idea has been already proposed as the concept such as "CALS", and it is partly put in practical use. Various elements are involved in CALS, and its definition is not fixed yet, but the following three points are regarded as important aspects.

(1) To construct an environment capable of exchanging technical information such as design drawings, written information such as reports, and transaction information generating accompanying with order issuing and receiving, between departments in an organization, or between plural organizations, directly in the form of electronic information, and without restrictions of the hardware.

(2) To allow all concerned parties (organizations) to function as one organization, by sharing information and utilizing whenever necessary by all concerned parties (organizations), in all aspects from development and design of products, to procurement of materials, and maintenance and management after shipping.

(3) To realize a so-called multimedia system capable of exchanging not only simple numerical data as in the conventional computer system but also image and sound.

As elements necessary for realizing such CALS, the following standards for input and exchange of information is needed. More specifically, aside from the SGML, the following standards has been already established: EDI (Electronic Data Interchange: standard of exchange of electronic data, partly specified already in ISO7372 as EDIFACT), STEP (Standard for The Exchange of Product model data: standard of product design drawing data, ISO10303), CGM (Computer Graphics Metafile: standard of storage and exchange of graphic data such as drawings and illustrations), IGES (Initial Graphics Exchange Specifications: standard of format data of CAD/CAM system), and CCITT Group 4 (International Telegraph and Telephone Consultative Committee Group 4: standard of compression technique for exchange of graphic data).

Further considerations must be also given to integration and security of database, and moreover, for example, the software for converting the document made by using various formats of hardware and software into SGML format automatically is also necessary.

When the CALS, which may be dared to be said to be a global paperless movement, is realized, the electronic information of the working process on the whole related to the technology including design and manufacturing can be exchanged beyond the barriers of enterprise, not limited to the departments within the own company, and the marketing research, planning, design, purchase of parts, manufacture, and manual writing hitherto conducted in the time series can be done simultaneously and parallel, that is, the so-called CE (Concurrent Engineering) can be realized. On the other hand, the plural departments within the enterprise already diversified and having complicated functions can be integrated, which is known as EI (Enterprise Integration), or a virtual enterprise can be organized by plural companies by subcontracting non-specialty jobs to other companies, which is known as VC (Virtual Corporation).

When plural processes in an enterprise or plural enterprises are linked by network, sales and manufacturing, design and manufacturing, and marketing and manufacturing can be executed through close relations, respectively. An integrated database beyond the barriers of departments or enterprises can be built up through network. While sharing various data, as each department or each enterprise promotes the operation, the waste can be eliminated, the decision is made promptly, and the job is sophisticated (that is, a higher value is added). In particular, the productivity of the so-called white-collar workers, who conventionally made and exchanged a tremendous amount of documents to fulfill the main duties of designing and planning, market cultivation, opinion adjustment among departments, and negotiations with other companies, will be notably enhanced, and the radical change of jobs relating to plural departments and plural enterprises is brought about, which may be called business process reengineering.

When however, the document management is standardized into database by employing CALS, the ad hoc work flow cannot be solved only by introducing the SGML with the conventional concept of document-oriented work flow only. From such point of view, recently, development is being promoted for the computer software called groupware for managing the group-oriented work flow. The groupware is a kind of computer software designed to promote the job executed by plural workers efficiently.

The hitherto known groupware includes functions of schedule management of workers engaged in a same job, automatic setting of meeting hours, and automatic transmission of job instructions by electronic mail from the group leader to the individual group members. In other words, it aims at production work flow management by using the conventional electronic mail function, between plural terminals connected by LAN or the like.

As clear from the description herein, of the four types of work flow, various products of computer software are already available for the management of two types of document-oriented work flow, and further by using not only SGML but also CALS, it is possible to handle all documents systematically within an enterprise in future. Concerning the management of group-oriented production work flow, when not sufficient in function, various of computer software called groupware are realized, and it is expected that the functions may be further fulfilled in the future. However, as for the management of group-oriented ad hoc work flow, little has been attempted so far.

For example, in the research and development tasks in the enterprise, it is necessary to take in the events in consideration of the corporate job management rules, shop standard and statutory regulations (for example, GCP:Good Clinical Practice for pharmaceuticals), register various data generating in the process into the object-oriented database, understand the situations from the physical aspect, search the next process, or search the information of related organization, document and person, in the course of execution of the tasks.

In such a case, the management of group-oriented ad hoc work flow is essential, and it requires the technique for formatting the events relating to the activities of persons into database. In the conventional database functions such as RDB (relational database) and NDB (network database), however, since the manner of capturing the information differs on each scene of the job, linking of items of the database is complicated, and it is difficult to extract necessary information, and hence it was substantially impossible to form into a working system.

In this background, by the advent of the object-oriented database (OODB), lately, it has been made easy to formulate events relating to personal activities into database, and pick up relating information.

SUMMARY OF THE INVENTION

The invention is devised in the light of such circumstances, and it is an object thereof to present, for example, in research and development of pharmaceuticals, a constructing method of organization activity database for taking in the events in consideration of the work management rules, shop standard and statutory regulation (GCP) etc., for analyzing the organization activity on the various pieces of information generating in the process, and for registering the information in the OODB, understanding the work situation from the physical aspect, searching the next process, and searching the information of related organization, document and person, an analysis sheet used therein, and an organization activity management system using the constructed database. Thereby, it is a further object to manage integratedly the four types of work flow necessary or ordinary organization activities, that is, the document-oriented production work flow, document-oriented ad hoc work flow, group-oriented production work flow. and group-oriented ad hoc work flow.

The constructing method of organization activity database, which managing the organization activity with use of a database management system operating on the hardware, comprises steps of: for a real model in which plural concepts including concept of action handled in the organization activity are defined, defining each concept by stratifying all concepts handled in the organization activity in which plural basic concepts composing the organization activity are made to be highest stratum, and defining each sentence pattern by arranging and integrating meaning of each verb deciding a concept of action accompanying with organization activity and each example which can be taken by said verb in that meanings, and by stratifying them; creating a logical model corresponding to said real model by fitting said defined concept to said defined sentence pattern; and making a mounted model by converting the created logical model into a descriptive system suited to said database management system.

The basic concepts includes at least person, organization, article, document, meeting and event.

The analysis sheet used for the organization activity database has item columns for describing the relation with lower concept with respect to said each basic concept, and item columns for describing the relation fitting each basic concept to said sentence pattern.

The analysis sheet is prepared corresponding to each basic concept of at least person, organization, article, document, meeting and event.

The organization activity management system, which managing the organization activity with use of a database management system operating on the hardware, comprises: server environment having: organization activity database which is constructed by, for a real model in which plural concepts including concept of action handled in the organization activity are defined, defining each concept by stratifying all concepts handled in the organization activity in which plural basic concepts composing the organization activity are made to be highest stratum, and defining each sentence pattern by arranging and integrating meaning of each verb deciding a concept of action accompanying with organization activity and each example which can be taken by said verb in that meanings, and by stratifying them; creating a logical model corresponding to said real model by fitting said defined concept to said defined sentence pattern; and making a mounted model by converting the created logical model into a descriptive system suited to said database management system; a document database accumulating information relating to documents, a process database accumulating information of process relating to organization activity, and client environments having plural retrieval functions capable of accessing the database management system using each one of plural basic concepts, documents and processes as retrieval key of higher stratum, wherein said database management system manages said organization activity database, document database and process database by connecting each other, and said client environments are capable of accessing the information accumulated in any database in an arbitrary order by outputting the retrieval key from each retrieval function and giving to said database management system.

The basic concepts in the organization activity management system includes at least person, organization, article, document, meeting and event.

The above and further objects and features of the invention will more fully be apparent from the following detailed description with accompanying drawings.

BRIEF DESCRIPTION OF THE DRAWINGS

FIG. 7 is a graph showing a hierarchical structure of concept;

FIG. 10 is a graph showing method of use of a verb (to put);

FIG. 11A is a graph showing a connotation of person;

FIG. 11B is a graph showing a connotation of person;

FIG. 12 is a graph showing an entering procedure of person sheet;

FIG. 13 is a graph showing a connotation of organization;

FIG. 14 is a graph showing an entering procedure of organization sheet;

FIG. 15 is a graph showing a connotation of article;

FIG. 16 is a graph showing an entering procedure of article sheet;

FIG. 17 is a graph showing a connotation of action;

FIG. 18A is a schematic diagram showing an example of action sheet;

FIG. 18B is a schematic diagram showing an example of action sheet;

FIG. 19 is a graph showing a connotation of meeting;

FIG. 20 is a graph showing an entering procedure of meeting sheet;

FIG. 21 is a graph showing a connotation of document;

FIG. 22 is a graph showing an entering procedure of document sheet;

FIG. 23 is a schematic diagram showing an example of document sheet;

FIG. 24 is a graph showing a connotation of event;

FIG. 25 is a graph showing an entering procedure of event sheet;

FIG. 26A is a graph showing an entering procedure of work name sheet;

FIG. 26B is a graph showing an entering procedure of work name sheet;

FIG. 28 is a schematic diagram showing an example of display screen by the system of the invention;

FIG. 30 is a schematic diagram showing an example of display screen by the system of the invention;

FIG. 31 is a schematic diagram showing an example of display screen by the system of the invention;

FIG. 34 is a schematic diagram showing an example of display screen by the system of the invention;

FIG. 35 is a schematic diagram showing an example of display screen by the system of the invention;

FIG. 40 is a schematic diagram showing a logical model;

FIG. 45 is a schematic diagram showing an example of display screen by the system of the invention;

FIG. 47 is a schematic diagram showing an example of display screen by the system of the invention;

FIG. 48 is a schematic diagram showing an example of display screen by the system of the invention;

FIG. 49 is a schematic diagram showing an example of display screen by the system of the invention;

FIG. 53 is a schematic diagram showing an example of display screen by the system of the invention;

FIG. 54 is a schematic diagram showing an example of display screen by the system of the invention;

FIG. 55 is a schematic diagram showing an example of display screen by the system of the invention;

FIG. 56 is a schematic diagram showing an example of display screen by the system of the invention;

FIG. 57 is a schematic diagram showing an example of display screen by the system of the invention;

FIG. 58 is a schematic diagram showing an example of display screen by the system of the invention;

FIG. 60 is a schematic diagram showing an example of display screen by the system of the invention;

FIG. 62 is a schematic diagram showing an example of display screen by the system of the invention; and FIG. 63 is a schematic diagram showing an example of display screen by the system of the invention.

DESCRIPTION OF THE PREFERRED EMBODIMENTS

Figure 1:
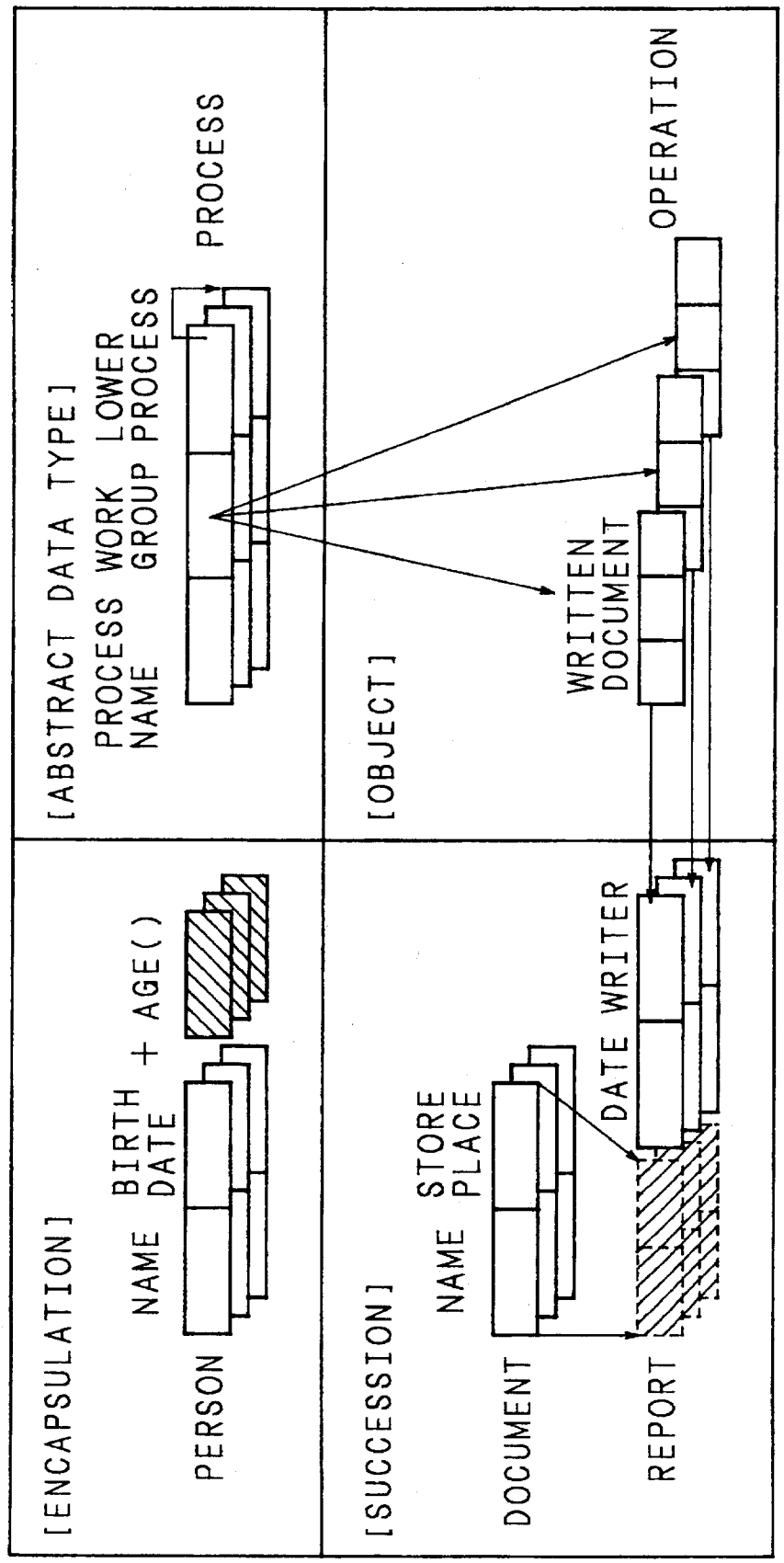
FIG. 1 is a schematic diagram showing a basic concept of object-oriented database.

Referring now to the drawings, preferred embodiments of the invention are described in detail below.

First is explained a data modeling method necessary for constructing an object-oriented database (OODB), that is, a constructing method of database of the invention. The invention employs the object-oriented database management system (OODBMS). Referring to the schematic diagram of FIG. 1, the basic concept of OODB is described below.

In the OODB, four concepts are important, that is, object, abstract data type, encapsulation and inheritance. The object is, whether visible or not, the subject of recognition by person. For example, as shown in FIG. 1, an action conducted by person in a certain process is handled also as an object.

The abstract data type refers to the data type combining the following three concepts. The first is the concept of a set of data elements and integration of its manipulation (data formatting). The second is the concept of structuring for composing a new data type from the existing data type. The third is the concept of separation (abstracting) of the specification and its realizing method as seen from the user.

In the example shown in FIG. 1, the process is the abstract data type. The process is defined as the data type having, as data items, the process name, plural jobs (a job group) to be executed in the process, the lower process which is the process of the own data type. By employing such abstract data type, module forming is thorough, and recycling and maintainability of data are enhanced.

Encapsulation is a concept known as information concealment for completely concealing the information about how the object is realized or the like, capable of accessing the object only by sending the message and capable of using the function.

In the example shown in FIG. 1, the name, date of birth, age and others are defined for a person. In the conventional relational database (RDB), they were determined as attributes that can be expressed by characters and numerical values. In the OODB, however, the attribute, for example, the age is defined as the attribute that can be calculated whenever from the date of birth and the present date. In other words, the procedure can be handled integrally.

Finally, inheritance is a genetic term, meaning that the constitution and character of the parent (ancestor) are transmitted to the offspring (descendent). The example shown in FIG. 1 shows that the report is an offspring of the document, and the document name and store place are defined in the document as the parent. In the report as the offspring, on the other hand, these attributes defined in the document as the parent are inherited as the own items and can be used without defining again.

It is the OODB that is the system having such features and the basic concept of the conventional database management system such as exclusive control and simultaneous execution control.

Figure 2:
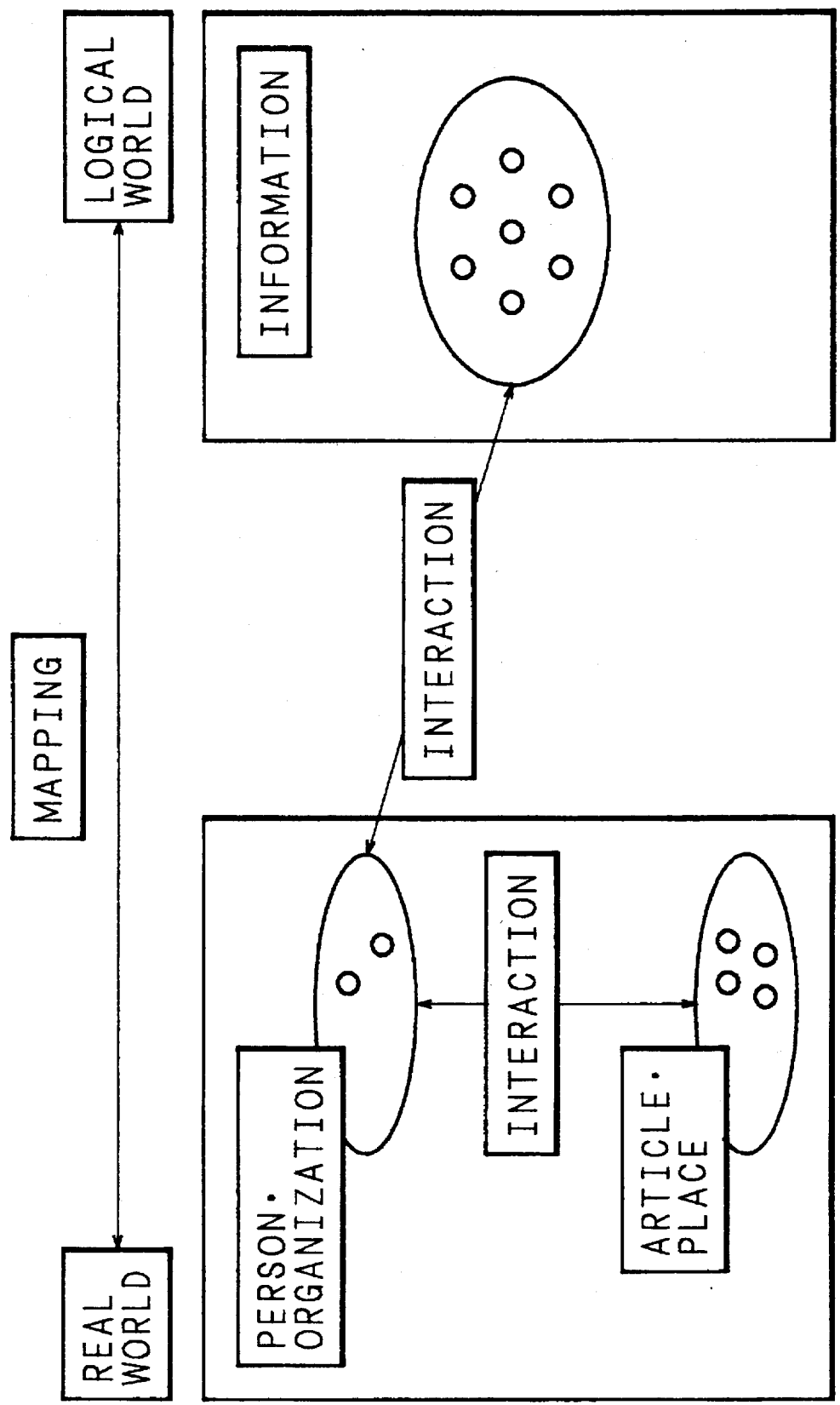
FIG. 2 is a schematic diagram explaining a basic concept of data modeling technique employed for the OODB in the system of the invention.

Referring next to the schematic diagram in FIG. 2, the basic concept of data modeling technique employed for the OODB in the system of the invention is described.

The most basic concepts in an organization for producing something by plural people such as an enterprise are persons, articles, money and information. Herein, hence, the real world is regarded as a model of interactions of persons and organization, and articles (and place). In a mode very close to the state in which the persons recognize such model, mapping (logical modeling) is applied to the logical world, that is, the world that can be handled by the computer. The state after mapping of the real world into logical world is called information, and the information is modeled as interactions of persons and organization.

Figure 3:
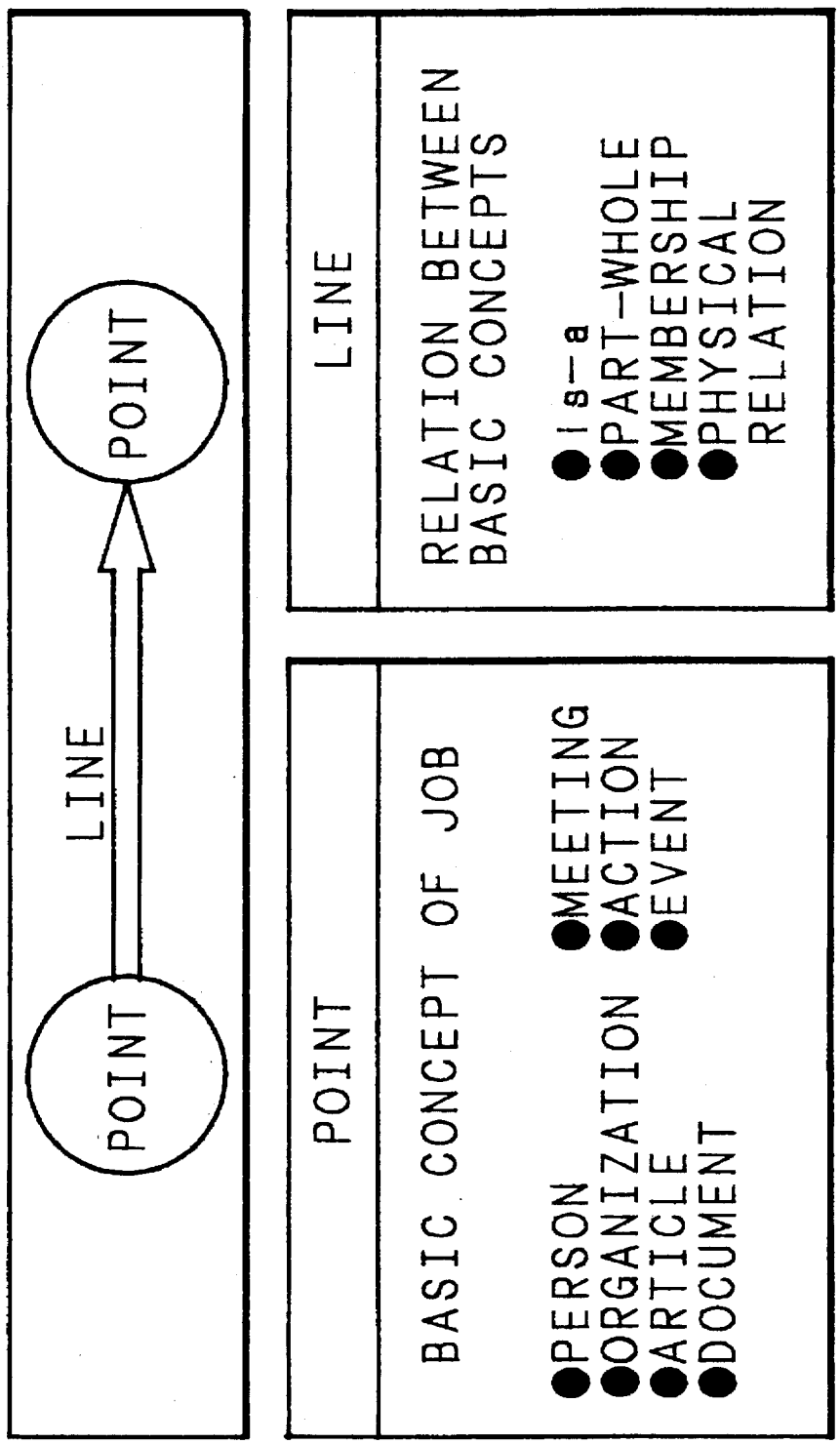
FIG. 3 is an explanatory diagram of concept for expressing a basic model with points and lines.

As an important concept for realizing a basic model, as shown in the schematic diagram of FIG. 3, the invention employs an idea of expressing all events by points and lines. Herein the point is defined as the word for expressing the concept, and the line is defined to express the connotation possessed by the concept.

The point is defined as the word for expressing the concept, and more specifically, among the concepts handled in daily job, the seven types comprising the person, organization, article, document, meeting, event action are recognized as basic concepts. All other compound concepts may be regarded as materialized concepts of these basic concepts. Therefore, all concepts can be organized as a graph structure having these seven basic concepts at the peaks.

The line is defined to express the connotation possessed by the concept, and specifically the "is-a" relation, "part-whole" relation, membership relation, and physical relation may be employed as basic relations. Herein, the "is-a" relation is the relation between abstract concept and concrete concept described above, for example, "A is B". The "part-whole" relation refers to such a relation as "material and product". The membership relation is an intrinsic feature possessed by a certain concept. The physical relation is a coupling relation of concept and concept, that is, so-called graph relation.

On the basis of such idea, for example, all concepts handled in daily works in an enterprise or the like can be modeled by points and lines.

Figure 4:
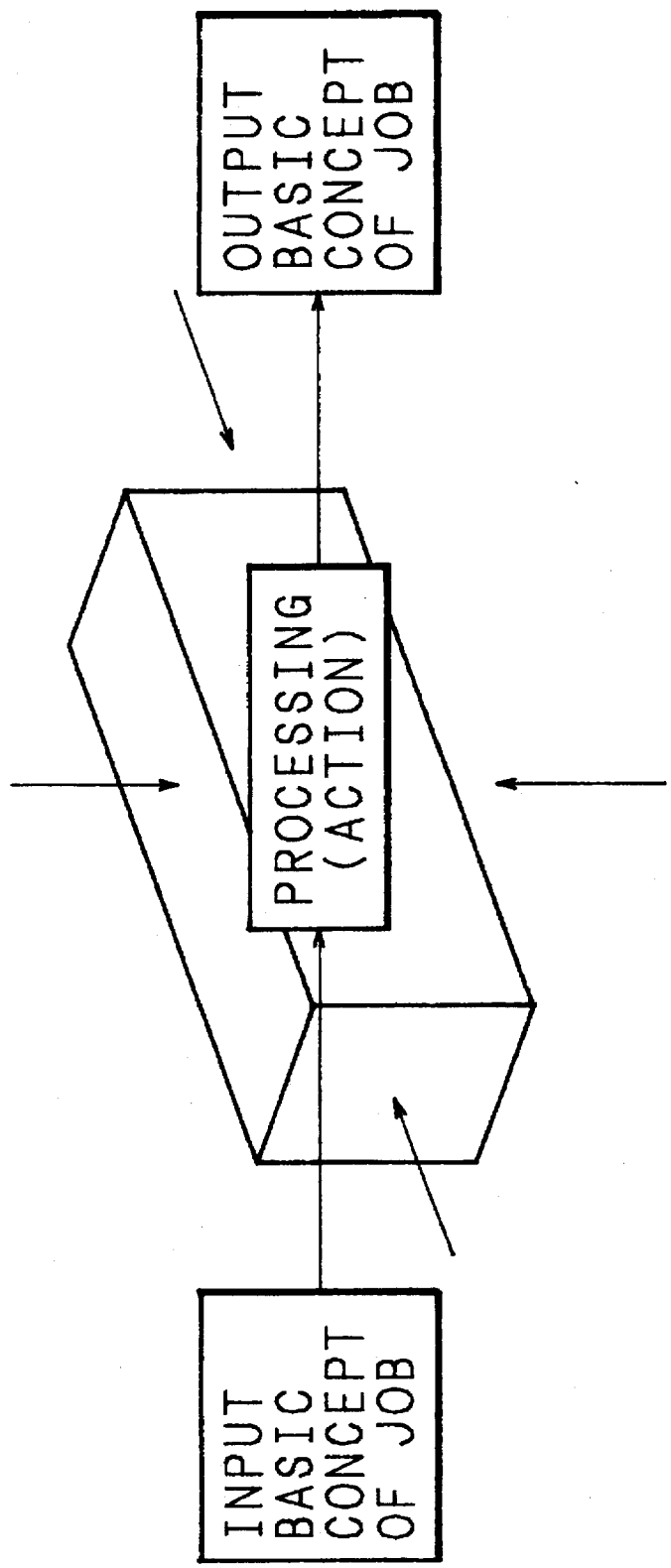
FIG. 4 is an explanatory diagram of DFD-like node.

Incidentally, the daily job in an enterprise is development of "how to achieve (means) what request (purpose)". In other words, it may be regarded as a system constructed by repeatedly executing the development of purpose and means. The system is basically composed of a hierarchical structure of basic elements of "doing some process on one input and obtaining some output". In the formation of such hierarchical structure, abstract and concrete techniques are applied recursively. Therefore, as the modeling method of basic elements of hierarchical structure, the DFD (Data Flow Diagram)-like concept is introduced. Such ideal is called DFD-like node herein, and it can be graphically expressed as shown in the schematic diagram in FIG. 4.

The structural model is explained. Logical modeling of the real task model is to convert into a format that can be handled by the computer. The man manipulates the information through the software, and in this sense the software is also one of the concepts handled in the task. Its structure should be preferably as close to the personal thinking as possible. Therefore, it is disclosed that the software is composed of what structural factors, and the realizing method of the basic ideal of modeling described so far is explained below. The software is basically composed of three structural factors, that is, object and message, stratum, and dimension.

Figure 5:
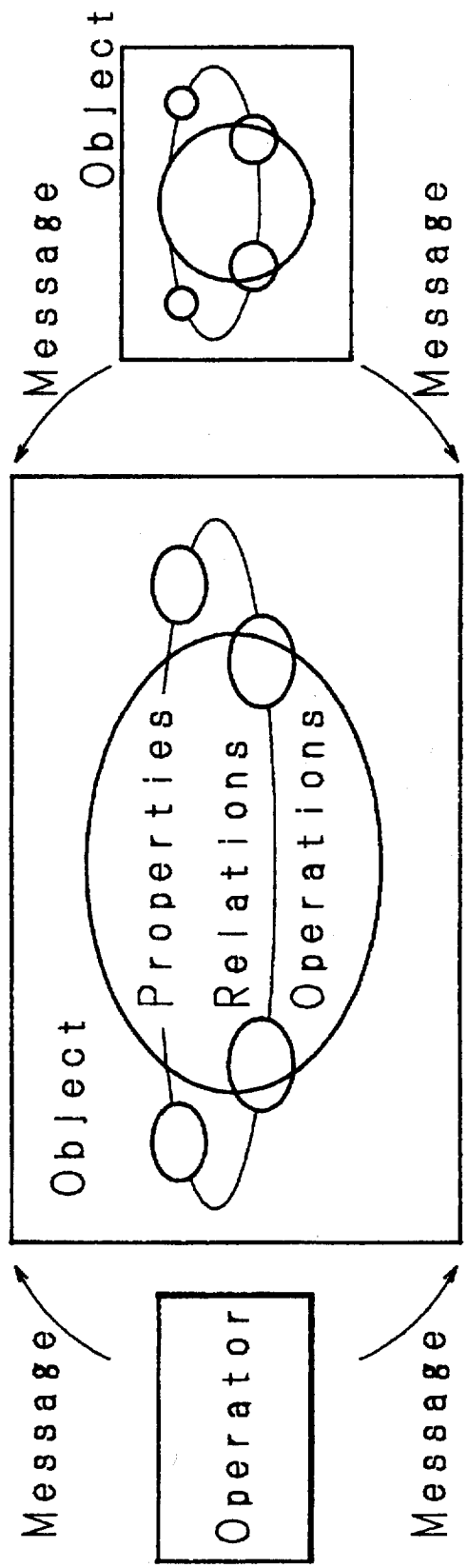
FIG. 5 is a schematic diagram showing the relation of object and message.

The object and message are described first while referring to the schematic diagram of FIG. 5, but the object itself has been explained already. In the invention, the object is regarded as the subject. The object has the connotation possessed by the object, and the intrinsic behavior that the object should possess. Therefore, the object is active and subjective. The dialog between the object and the person or operator, or other object is achieved only through message. By this message, the mutual relation between person and the object as information can be manipulated.

Next, the stratum is explained, but "connotation" and "denotation" must be explained at first. The connotation and denotation are the words relating to the "concept". That is, the concept possesses the connotation and denotation. The definitions of the Kojien Dictionary are cited herein.

The concept is "a form of thought for understanding the essence of a thing. Essential features of a thing and their relation is the content of the concept (connotation). The concept has a generality because it is applied to things (denotation) in a specific range having a same essence. For example, the connotation of the concept of person is a feature of person as a person, while the denotation relates to all persons. However, there is also a concept (individual concept, independent concept) capturing an individual (for example, Socrates). The concept is expressed in language, and exists as its meaning. Establishment of a concept is explained in various opinions philosophically, and it is an ordinary opinion to extract content common to many things experienced (abstract), and discard incidental nature belonging to individual things only (abstraction), it is opposite to the position of recognizing the concept (congenital concept) independent from the experience".

The connotation is "a total of features (nature) commonly possessed by things belonging to a range (denotation) to which the concept is applied. In form logic, the connotation and denotation increase in opposite directions. For example, the concept of an academician includes all types of academicians in the fields such as philosophy, literature, science and economics, but when the feature of "philosophical study" is added to the concept of academician, the connotation increases and the denotation decreases to the contrary".

The denotation is "a range of things to which a certain concept is applied. For example, the denotation of the concept metal includes gold, silver, steel, iron, etc".

Figure 6:
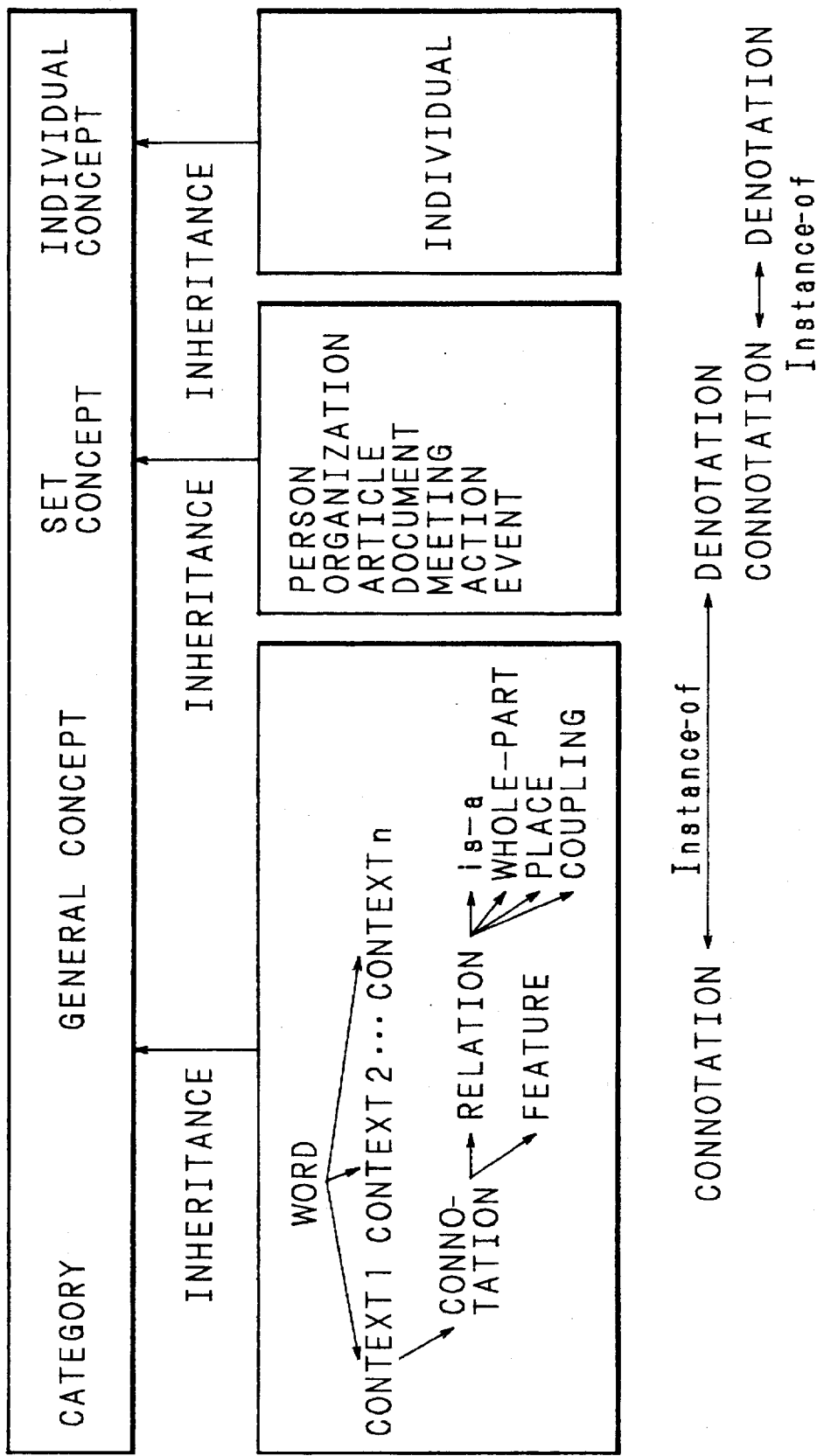
FIG. 6 is a schematic diagram of structural model of the invention.

It is a word that expresses the concept, and the word often differs in the meaning depending on the context in which it appears. In this case, the concept expressed by the word has plural connotations. When the connotations are different, the denotations are also different. In the task modeling, it is necessary to model the connotation and denotation of such word and concept. In the invention, therefore, the structural model as shown in the schematic diagram of FIG. 6 is considered.

Herein, general concepts such as category, set concept and individual concept are recognized as congenital concepts, and they are positioned as higher concepts of the structural model in the invention, and the concepts are considered to be inherited.

The structure of concept is hierarchical, and its types and mutual relation may be listed up as shown in the graph in FIG. 7 according to the "Software Production Engineering Handbook". The meaning of each concept shown in FIG. 7 is defined in the Kojien Dictionary as follows.

Category: "A most general basic concept (for example, entity, causal relation, quantity, quality, etc.). It is regarded as a fundamental being of existence (Aristotle), or as a congenital concept of wisdom (Kant), among other thoughts. (Kant: quantity (single, multiple, all), quality (existence, negation, limitation), relation (entity and incidence, cause and dependence, mutual action), mode (possibility and impossibility, realism and non-realism, necessity and incidence.))"

Set (mathematics): "A group of things, having a definite standard for distinguishing whether an arbitrary thing belongs to it or not, and whether two belonging things (essences or elements of a set) are equal or not".

Set concept: "A concept indicating a set of individuals as the whole. For example, class, audience and constellation. However, the class is a set concept for individual students belonging to it, but is an individual concept when meaning each one of many classes".

Individual concept: "A general concept, by contrast to set concept, obtained by applying a same significance to the individuals included therein. For example, people and house".

General concept: "A concept commonly applied by many things without changing the meaning. For example, book and man".

Cross concept: "A concept overlapping part of denotations. For example, scholar and educator".

Relative concept: "A concept particularly deep in relation with other concept, and its significance is further clarified by comparison therewith. Example, day and night, and heaven and earth. Compare absolute concept".

Disjunctive concept: "A concept belonging to a same category, with its denotations not crossing at all and completely separated. For example, red, black, white, or triangle and quadrangle".

Contradictory concept: "A concept not permitting anything intermediate, that is, one is directly negation of the other (e.g. presence and absence, person and non-person). It should be distinguished from the opposite concept of mere quantitative relative difference (e.g. sage and fool). Of the contradictory concept, affirmative meaning of a certain nature is positive (affirmative) concept (e.g. presence, person)".

Opposite concept: "Of concepts subordinate to a certain group of concepts, the concept having the maximum difference as seen from the connotation. For example, large and small, beautiful and ugly, and it is characteristic that a third party is permitted between them (neither large nor small, etc.)".

Equivalent concept: "The concept coinciding perfectly in denotation, but not coinciding in connotation before the viewpoints of discussion are different. For example, sward and spirit of samurai, and book and mental crystal are equivalent concepts".

Identical concept: "The concept completely same in connotation and denotation, although language patterns are different. For example, father and mother, and parents, equilateral triangle and conformable triangle".

Independent concept: "A concept expressing a specific individual. For example, this desk, the author of Tales of Genji. (Single concept, fixed concept)"

Incidentally, person is acting on two dimensions of space and time. Therefore, when modeling a work flow of a task mainly conducted by persons, it is extremely important to form a concept model having the seven types of basic concepts at the peaks into a model of space, time, and time-space concepts which are sub-models of the concept model. In the invention, complicated complex concepts not having the time concept are handled in the space model, and time concepts such as sequence relation and status transition are handled in the time model. In the time-space model, objects considering both space concept and time concept are handled.

Figure 8:
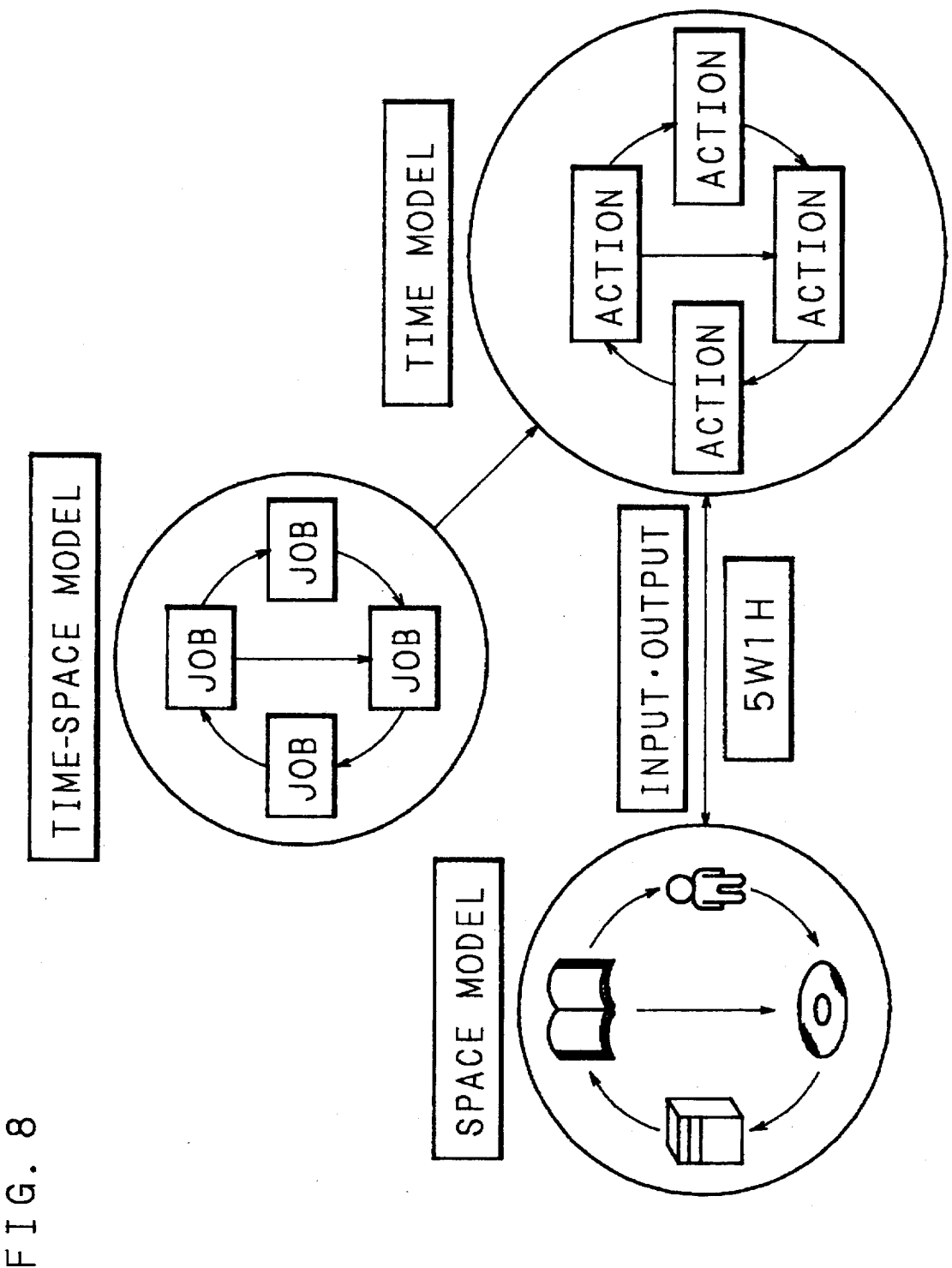
FIG. 8 is a schematic diagram showing the dimensions of space and time.

As shown in the schematic diagram of FIG. 8, in the invention, of the seven types of basic concepts, concept models of six types, that is, person, organization, article, document, meeting and event are modeled as space models, and the concept model of action is modeled as time model. The interactions of space model and time model can be modeled by expressing in the relation as input and output of action, and basic sentence patterns of so-called 5W1H (When, Where, Who, What, Why, How).

In the invention, meanwhile, the boundary of time-space model and time model is regarded to be ambiguous and not distinguished clearly. The reason is that a set extracted from the network of action and named is regarded to be the concept to be handled in the time model. Usually, they are handled as the concepts of working unit and jobs. It may be also understood as the manner of seeing to the time model necessary in the situation in which the person is placed. For the purpose of such flexible way of viewing, it is important to handle the boundary of time and time-space ambiguously.

Figure 9:
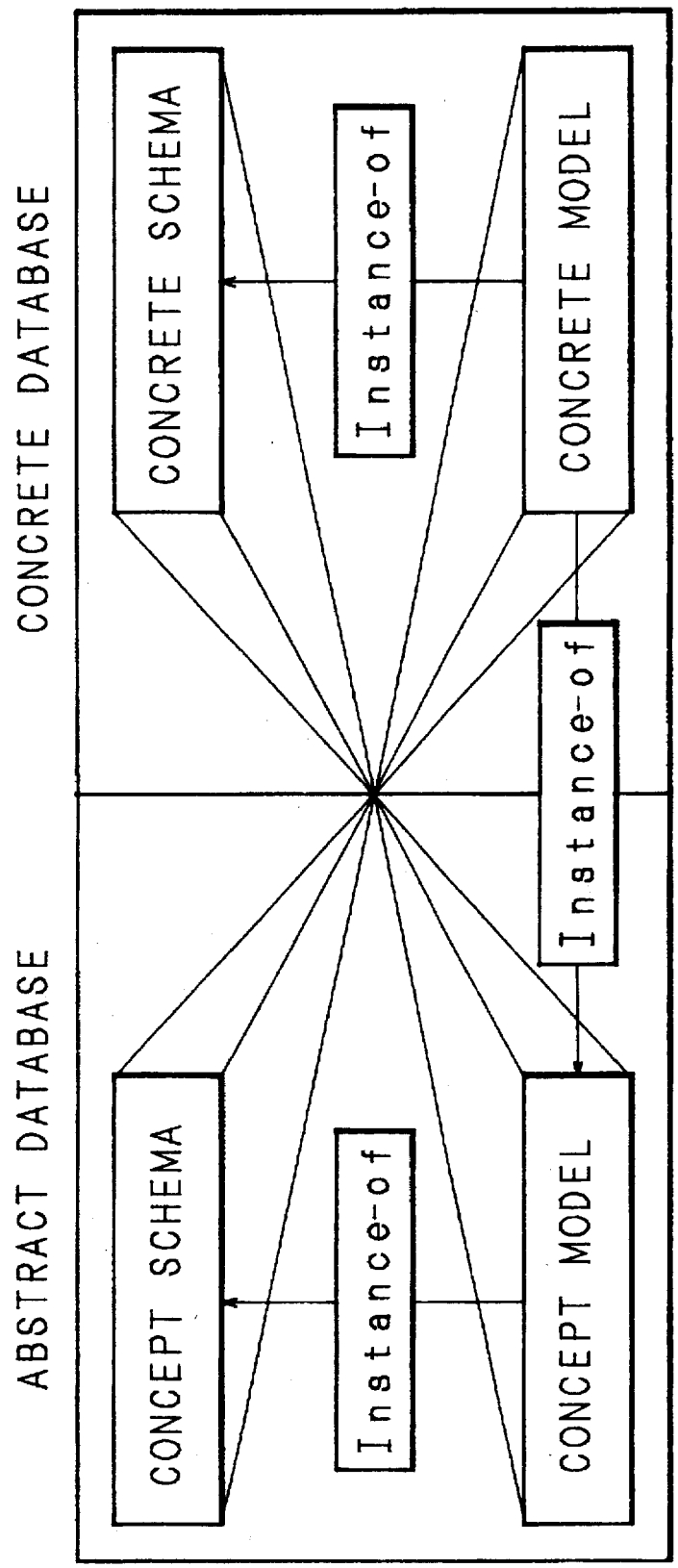
FIG. 9 is a schematic diagram showing a database structure.

The database structure is explained below. When the relation of connotation and denotation explained above is mapped into the data management mechanism of the presently available DBMS (database management system), a schematic diagram in FIG. 9 is obtained. More specifically, the connotation corresponds to the concept schema, the denotation/connotation to the concept model, the denotation to the concrete model, and the connotation (technical restriction) to the concrete schema.

Herein, the concrete schema in the concrete database is the schema that must be provided in relation to the restrictions in the existing technique, but it is a schema not necessarily required in the meaning. It is the abstract database that is intended to manage an abstract event, and it is the concrete schema that is intended to manage the specific value of the concept. The concept schema is the model presented in the invention in order to construct the concept model. The region for accumulating the concept handled in the job as the data according to the model is the concept model. This concept model is logically a connotation of the concrete model accumulated as concrete model. However, due to the present technical restrictions, the schema for managing the concrete model is needed in reality. That's the concrete schema. To generate a concrete schema from concept model, a specific rule is necessary, but the rule depends on the application software installed on the database. In the invention, therefore, conversion of concept model into concrete schema is defined as creation phase of mounted model.

According to such manner of thinking, the constructing method of database of the invention, that is, the modeling procedure is described below, and first to compose each model as a preparatory step, it is necessary to employ the uniform expression for registering in the OODB. In the invention, such expression is called normal expression, and the normal expression for composing the concept models of seven basic concepts, that is, person, organization, article, document, meeting and event, and action is defined, and by entering in the analysis sheet accordingly, registration of each concept model into the OODB is facilitated.

For this purpose, however, the concept must be managed. A specific explanation will follow. First, management of meaning of sentence, that is, management of context is described. The context is managed mainly on the verb, that is, mainly on the action out of seven basic concepts mentioned above.

It is the word that expresses the concept, and the word may differ in the meaning depending on the context in which it appears. That is, each word has plural connotations. When the connotations are different, the denotations are also different. For example, let us consider a verb "to put".

Example 1: Mother put bottles of beer into the refrigerator.

Example 2: A friend put his daughter in a leading company.

Fourteen conjugations of the verb "to put" mentioned in the Basic Japanese Verb Usage Dictionary are reprinted in FIG. 10. These two examples are fitted to the sequence of elements linked with the verb "to put" semantically and syntactically as follows.

Example 1; "Mother—person" put "bottles of beer—objects" (from xx—place) into "the refrigerator—place".

Example 2: "A friend—person" put "his daughter—person" in a "leading company——organization".

Herein, example 1 conforms to usage 2 shown in FIG. 2, and means to move from outside into inside of a place. Example 2 conforms to usage 3, and means to belong to group, organization and classification. In this way, one verb is used in many meanings. Similarly, persons, articles and organization may differ in connotation depending on the context (equivalent concept). Therefore, when defining a concept, it is important to manage the meaning of the word used in daily task as the meaning (context) together with its usage.

The management structure of concept may be considered as follows. That is, the category and general concepts such as set concept and individual concept are positioned as higher concepts in the invention as the congenital concepts, and the concepts are regarded to be inherited. Therefore,

* The word for expressing the concept is managed as point.
* The word may have plural contexts in which it appears.
* The context can have only one connotation of the word expessed on the context.
* The connotation may have a plurality of essential features of things and their relations.

The connotation is defined to have a plurality of essential features of things and their relations. Furthermore, the essential features and relations are defined as follows. An essential feature is a concept for defining the connotation expressed as a continuous quantity. Therefore, when an individual of the concept appears, the concept having characters and numerical values as values is handled structurally. A relation is a concept for defining the connotation expressed as a discrete quantity. Therefore, when an individual of the concept appears, the concept having others than characters and numerical values as values structurally is handled.

The content of the concept is the connotation, and when the connotation is different, the denotation to which the concept is applied is different. The concept model is uniquely a denotation of concept schema. Therefore, the management of denotation defined herein is the relation between the connotation, the concept model, and its denotation, the individual.

For management of the individual as the concretness, a concrete schema defining the virtual connotation is defined due to the present technical restriction. The concept defined in the concrete schema is called the virtual concept (VC). This VC actually manages the individual which is the denotation. Therefore, the connotation defined by the concept model has a mechanism for managing the VC, so that the connotation can manage indirectly denotation.

The line is a structure for handling the relation between concepts. The relation existing between concepts has basically a graph structure. Therefore, the structure of relation is defined as follows.

The "is-a" relation is a structure for handling the higher-lower relation of a concept. The higher concept is the including concept when the concept is in an including-included relation with respect to the denotation. The lower concept is the included concept. Forming of such concept is assembled by operation of abstracting and concreting.

Abstracting is an operation for extracting an essential feature or a common feature by ignoring the detail of a thing, and specifying the feature of the abstracted thing to be suited to the environments and situation in which it is used and recognized. The relation having such concepts as connotation is defined to be the "is-a" relation. The management mechanism necessary for the "is-a" relation is defined below.

It was stated above that plural connotations can be defined in the word. Therefore, when specifying higher and lower concepts of a certain concept, the connotation is included as value. The higher concept can have only one value, while the lower concept can have plural values. Therefore, seeing the higher from the lower, branching does not occur on the way. Limited to a certain connotation, it can be purely sorted as a genre.

The inheritance is, as defined above, the concept receives the connotation specified as the higher concept. Therefore, when referring to the connotation of a certain concept, the action of inheritance is repeated until reaching the highest concept. In the invention, as mentioned above, person, organization, article, document, meeting and event, and actions are defined at the concepts of the highest position. That is, these seven concepts function as the terminator of the inheritance mechanism.

The "part-whole" relation refers to the relation in which an object is composed of plural (two or more) objects as elements. Each element is a part of the whole. Each element may also have the "whole-part" relation.

On the basis of such manner of thinking, the constructing method of organization activity database of the invention according to it are specifically described below.

For example, a job handled as a task in general clerical processing is executed by (1) making a report for communicating with others, (2) making a report for announcing the result of the work, (3) making and issuing a delivery note when delivering merchandise, and (4) issuing a receipt when receiving merchandise, and thus the job is done through the medium of documents, or the record of the work is left as documents.

The procedure of the job or the manner of writing documents used in the job (slips, reports, notices, etc.) is generally formulated in the form of job manual, duty handbook, work instruction, and the like. In this condition, therefore, the information necessary for job model of objective job may be obtained in a sufficient quantity by utilizing these existing materials. In the invention, from such viewpoint, concerning the seven basic concepts of job model, that is, concept models of person, organization, article, document, meeting and event, and actions, the following information is collected from the existing materials by using corresponding analysis sheets.

Analysis sheets are prepared for the basic seven concepts for composing the job model, that is, person, organization, article, document, meeting and event, and actions (each is generally called the basic axis). The title item of each analysis sheet shows, for example, such as an action sheet in FIG. 18A and FIG. 18B described later and a document sheet shown in FIG. 23 described later, the relation that the connotation possessed by the word describing the basic axis can take. Therefore, each cell of the analysis sheet is composed to describe the specific name and the name of its related destination.

The connotation of each basic axis is as shown in the graph. In each graph, the relation possessed by the connotation, the existing materials for extracting the model, and the information to be collected are arranged. In the graph, the description of "information to be collected" is expressed by adding an identifier after each item, such as ".person" (in the case of person) and ".act" (in the case of action), in order to indicate clearly to collect information of each basic element.

The connotation of a person is explained at first by referring to the graphs in FIG. 11A and FIG. 11B. A person shows a concept that "a person having a certain role". The person's name as proper noun is handled as an instance of "a man having a certain role".

Concerning the occupation, for example: English teacher, doctor, carpenter, etc.

A member of an organization: Development section member, employee, etc.

Others: Patient, female, male, married person, etc.

The graphs in FIG. 11A and FIG. 11B show a list of classification of a person model, existing materials that can be used for extracting person model, and information to be collected therefrom. The specific entering procedure of person sheet is as shown in the graph in FIG. 12. FIG. 12 also shows the entering procedure of individual sheet. This is prepared in addition to the person sheet when it is necessary to distinguish individual from person.

Concerning the organization, the connotation is shown in the graph in FIG. 13. Two approaches may be considered as the technique for capturing the organization. One is the technique focusing on the system of organization, and the other is a technique focusing on the people composing the organization their attitude, motivation, behavior, etc. The invention employs the former, and the latter is expressed by other model.

The graph in FIG. 13 shows a list of classification of organization model, existing materials that can be used for extracting organization model, and information to be collected therefrom. A specific entering method of organization sheet is as shown in the graph in FIG. 14.

The connotation of the article is shown in the graph in FIG. 15. The article is anything on real world that can be touched by hand. Herein, the constructings and documents are excluded from the articles.

The graph in FIG. 15 shows a list of classification of article model, existing materials that can be used for extracting article model, and information to be collected therefrom. A specific entering method of article sheet is as shown in the graph in FIG. 16.

The connotation of action is shown in the graph in FIG. 17. Usable materials for extracting the action model are classified into two types.

*Materials describing sequence relations and conditions of the action
  *Materials describing the specific content of action (who, what, how, etc., corresponding to so-called 5W1H)

These materials correspond to job manual, job standard and the like. They are collectively called job manual hereinafter As the information to be collected about the action model, the so-called 5W1H as the basic formula of the Japanese grammar is employed as the rule for describing the action model. A specific entering example of action sheet is shown in schematic diagrams in FIG. 18A and FIG. 18B.

The connotation of the meeting is shown in the graph in FIG. 19. Materials used for extracting the meeting model are classified in two types.

*Announcement and proceedings of meeting (subtracting the name of the meeting, participating members, etc.)

*Procedure of meeting of job manual (purpose of meeting, holding procedure, holding conditions, relations with other actions)

A meeting model is a model of "meeting of plural people hitherto working separately by gathering together suddenly", and includes, besides the meeting itself (purpose, members, date, condition), preparation for the meeting (filing procedure, invitation), and jobs after meeting (making of proceedings, circulation, reporting of results of meeting). The meeting is held with the roles of "approval" and "decision" of a series of compound actions (for example, clinical trial). In such a case, an action before meeting and an action after meeting always exist, and the sequence of action and meeting is determined as the task of the company.

The graph in FIG. 19 shows a list of classification of meeting model, existing materials that can be used for extracting the meeting model, and the information to be collected therefrom. A specific entering procedure of meeting sheet is shown in the graph in FIG. 20.

The connotation of the document is shown in the graph in FIG. 21. A document model has following two meanings. The first is the document as information model of person, organization, article, action and meeting. In this case, as data items of document, person, organization, article, action, and meeting are entered as information. Therefore it can be used also as the reference material for making information model. The second is the document as article. In this case, this is a process of utilization and management of things from making of document until disposal.

The graph in FIG. 21 shows a list of classification of document model, existing materials that can be used for extracting the document model, and the information to be collected therefrom. A specific entering procedure of document sheet is shown in the graph in FIG. 22. The item name sheet showing the relation with each data item of job name sheet is also used together. An entry example of document sheet is shown in a schematic diagram in FIG. 23.

The connotation of the event is shown in the graph in FIG. 24. The event model is a set of the concept of "thing" and the concept of "incident". Further, the "thing" is defined as a visible article, and the "incident" is an invisible article. Herein, the event does not include the concepts of the other six basic axes, and deals with all other events.

The graph in FIG. 24 shows a list of classification of event model, existing materials that can be used for extracting the event model, and the information to be collected therefrom. A specific entering procedure of event sheet is shown in the graph in FIG. 25.

Finally, concerning the work which is a unit of job, it is necessary to register each work name, and the entering procedure and entering rule of work name sheet are described. More specifically, as shown in the graphs in FIG. 26A and FIG. 26B, the entering procedure of work name sheet is as follows.

(1) The page number, job name, work name (descriptive statement of work, and section in charge are extracted from the text file of work standard by manual operation, and original data is made.

(2) Work number is given by software processing.

(3) On the condition that the work name is a simple sentence, verb is extracted by software processing.

(4) Converted into the sheet considering the entry rule by verb, by software processing.

(5) Necessary items are entered in the sheet by manual operation, according to the entry rule.

Figure 27:
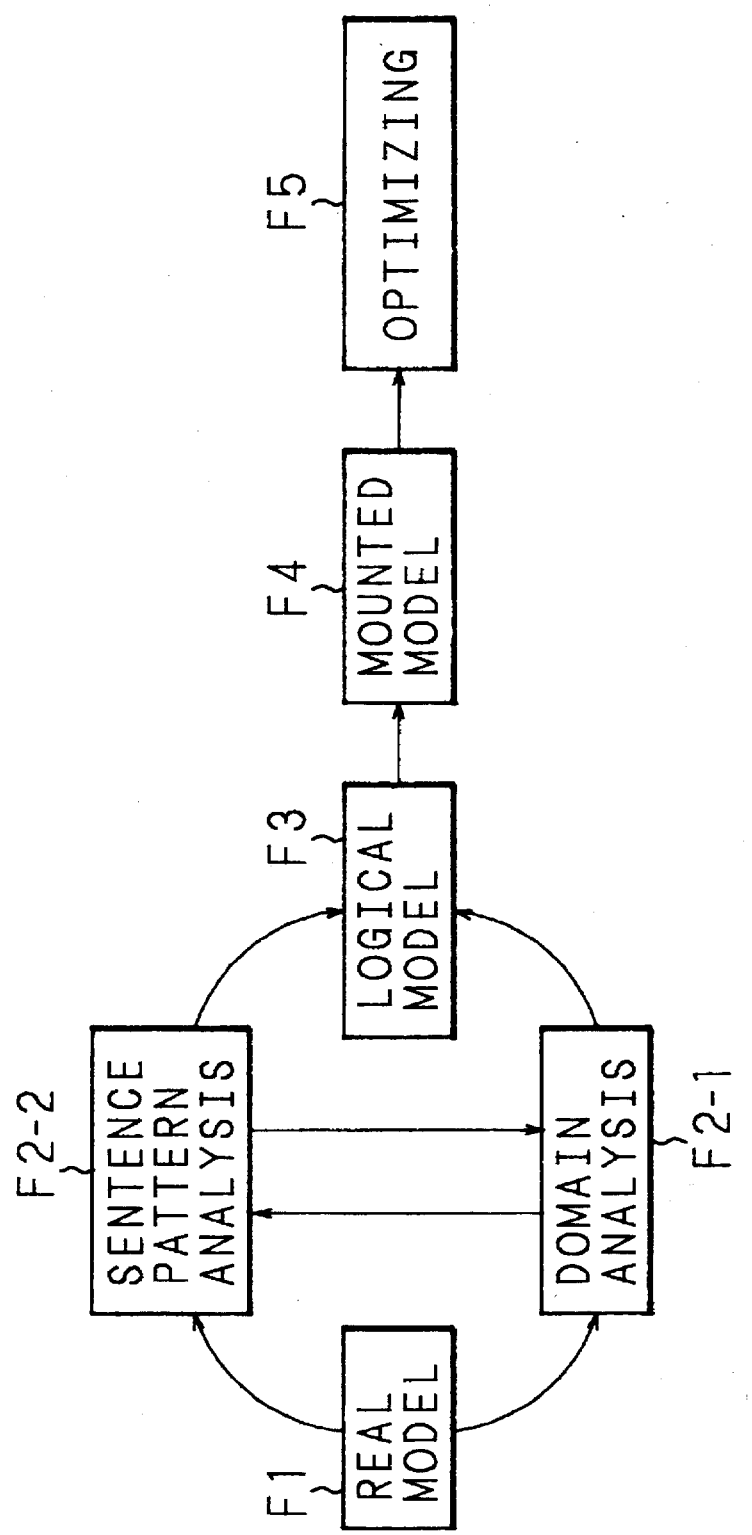
FIG. 27 is a schematic diagram of modeling procedure of constructing method of organization activity database.

The constructing method of database, that is, modeling procedure are specifically described below while referring to the schematic diagram of FIG. 27. The modeling procedure is roughly classified into five phases and six steps. The starting phase is the first phase F1 for making the real model defining the concept handled in the job. Specifically, documents described by using some descriptive system (hereinafter documents include both electronic information and printed information on paper) are collected or made up. The documents to be collected include, for example, the in-house procedures, shop rules, the text of the law, and slips.

Next, the real model created in the first phase F1 is subjected to domain analysis in phase F2-1 for analyzing the seven concepts, and sentence pattern analysis in phase F2-1 for extracting the relation mainly about the action model. These two phases, that is, the domain analysis (F2-1) and sentence pattern analysis (F2-1) complement mutually and are verified each other.

In the sentence pattern analysis, relating to the documents collected or created in the first phase F1, the verb is stratified according to the grammatical rule of 5W1H, and the context is defined. Specifically, as shown in FIG. 18A and FIG. 18B corresponding to the connotation of the action shown in the graph in FIG. 17, each item column of action sheet is described. Incidentally, an example of describing on a real paper sheet is shown in FIG. 18A and FIG. 18B, but as shown in a schematic diagram in FIG. 28, it may be also entered directly into the system as electronic information, by manipulating the terminal 5 of the organization activity management system (see FIG. 42 and FIG. 43) described later.

Figure 29:
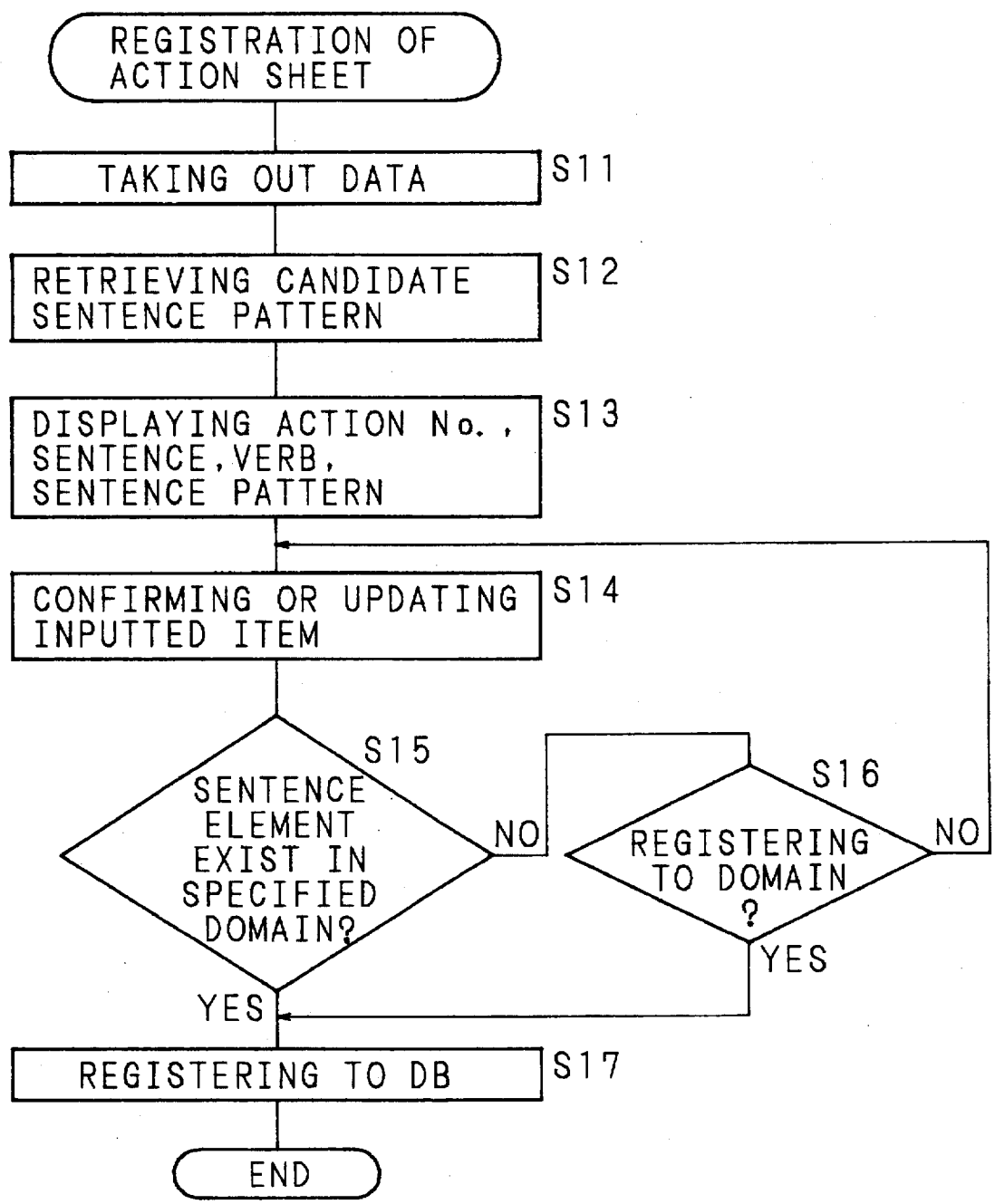
FIG. 29 is a flowchart showing procedure of registration process of action sheet.

The registration procedure for input of operation sheet by the terminal 5 is shown in a flowchart in FIG. 29. First, the screen for entering the action sheet is displayed, and data of one case is taken out from plural data (sentences) to be analyzed preliminarily accumulated in the system (step S11), At the same time, the sentence of the data is cut out in the sentence element, and the coinciding sentence pattern candidate is searched from the database using the verb as the key (step S12). Afterwards, the values of the action number, sentence, verb, sentence pattern, mark showing essential element or not, and other sentence elements are displayed on the screen of the terminal 5 as shown in FIG. 28 (step S13).

Herein, the operator confirms each display item on the screen of the terminal 5, corrects when necessary (step S14), and further instructs registration process. In response, it is checked when the specified value is present in the domain or not (step S15), and when present, that is, when YES at step S15, it is registered in the database (step S17). When NO at step S15, whether to register in the domain or not is inquired to the operator (step S18). When the operator instructs registration again, it is registered intact in the database (step S17), and when the operator does not instruct registration, the process returns to step S14.

In the domain analysis, on the other hand, relating to the documents collected or created in the first phase F1, six concepts out of the inclusive seven concepts, excluding the action, or the words are stratified and defined. More specifically, for example, relating to the document, each item column of the document sheet is described as shown in FIG. 23, according to the entry procedure of document sheet shown in the graph in FIG. 22. FIG. 23 shows an example of describing on a real paper sheet, but it is also possible to enter directly into the system as electronic data, by manipulating the terminal 5 of the organization activity management system of the invention described below as shown in the schematic diagram in FIG. 30.

Figure 32:
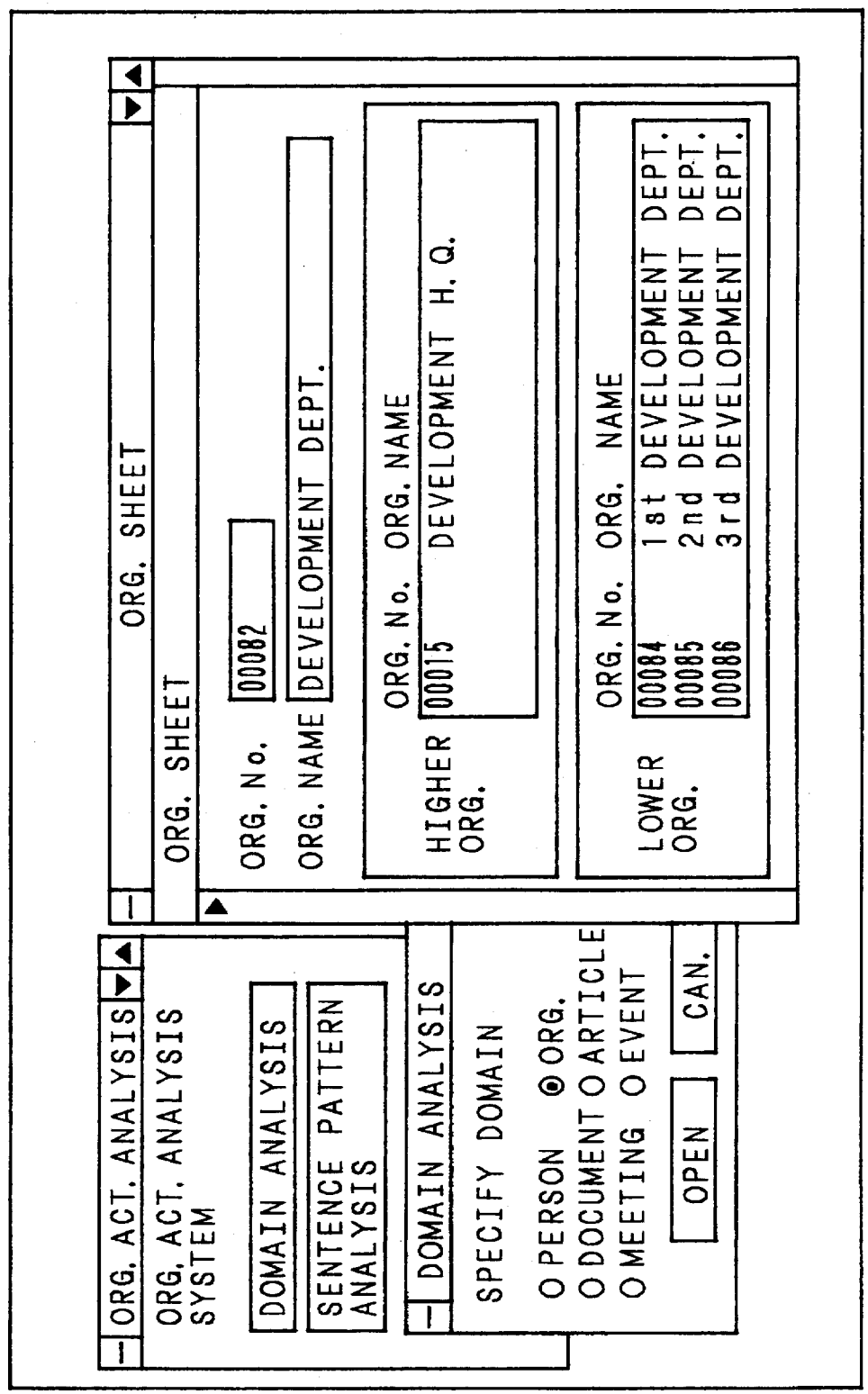
FIG. 32 is a schematic diagram showing an example of display screen by the system of the invention.
Figure 33:
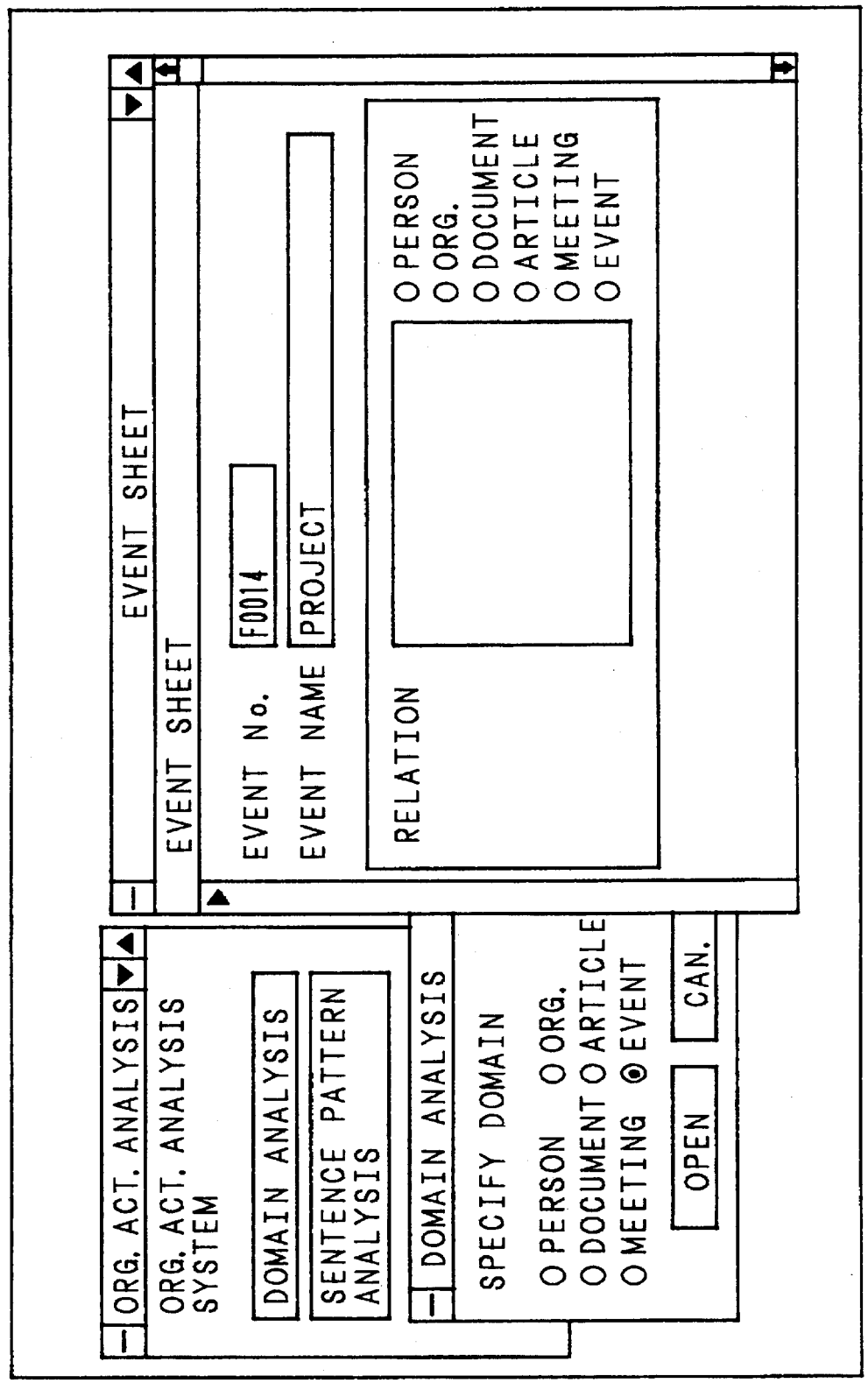
FIG. 33 is a schematic diagram showing an example of display screen by the system of the invention.

Similarly, an input example of the person sheet into the terminal 5 is shown in a schematic diagram in FIG. 31, an input example of organization sheet into the terminal 5 in a schematic diagram in FIG. 32, an input example of event sheet into the terminal 5 in a schematic diagram in FIG. 33, an input example of meeting sheet into the terminal 5 in a schematic diagram in FIG. 34, and an input example of article sheet into the terminal 5 in a schematic diagram in FIG. 35.

Figure 36:
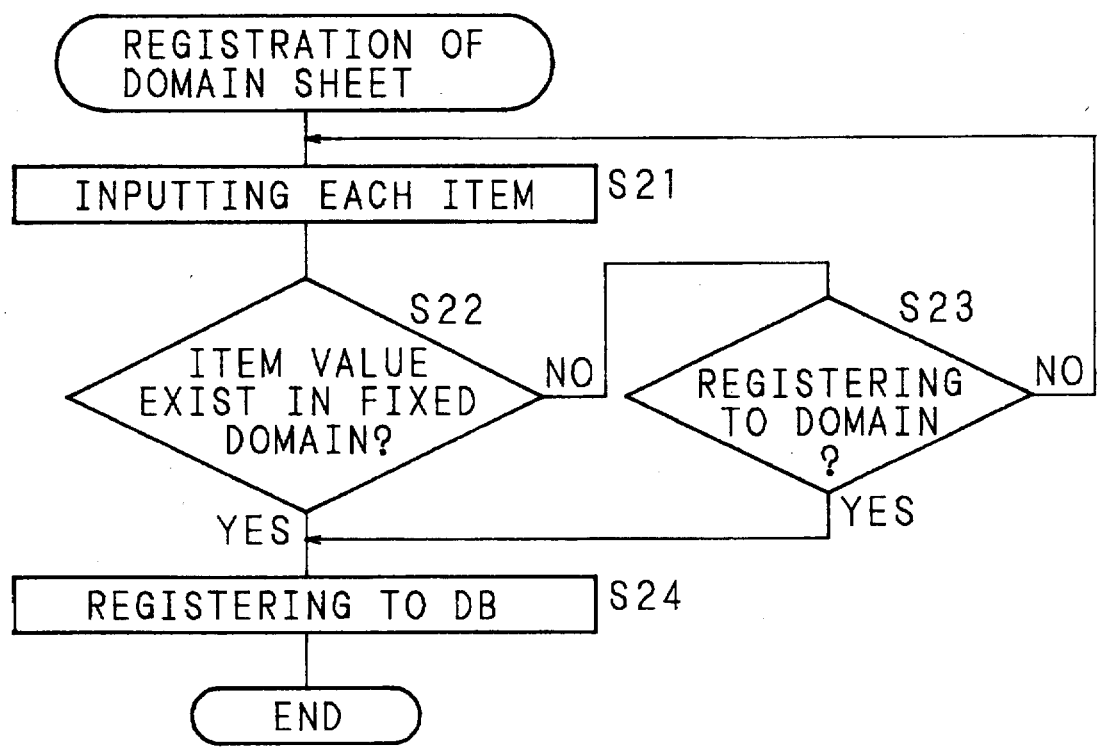
FIG. 36 is a flowchart showing procedure of registration process of domain sheet.

The registration procedure of input of each sheet by the terminal 5 for these domain analyses is shown in a flowchart in FIG. 36. First, the screen for input of the domain sheet is displayed, and the operator enters the value of each item, and instructs registration (step S21). Consequently, it is checked whether the input value is present in the existing domain or not (step S22), and when present, that is, When YES at step S22, it is registered in the database (step S24). When NO at step S22, whether to register in the domain or not is inquired to the operator (step S23). When the operator instructs registration again, it is registered intact in the database (step S24), and when the operator does not instruct registration, the process returns to step S21.

Figure 37:
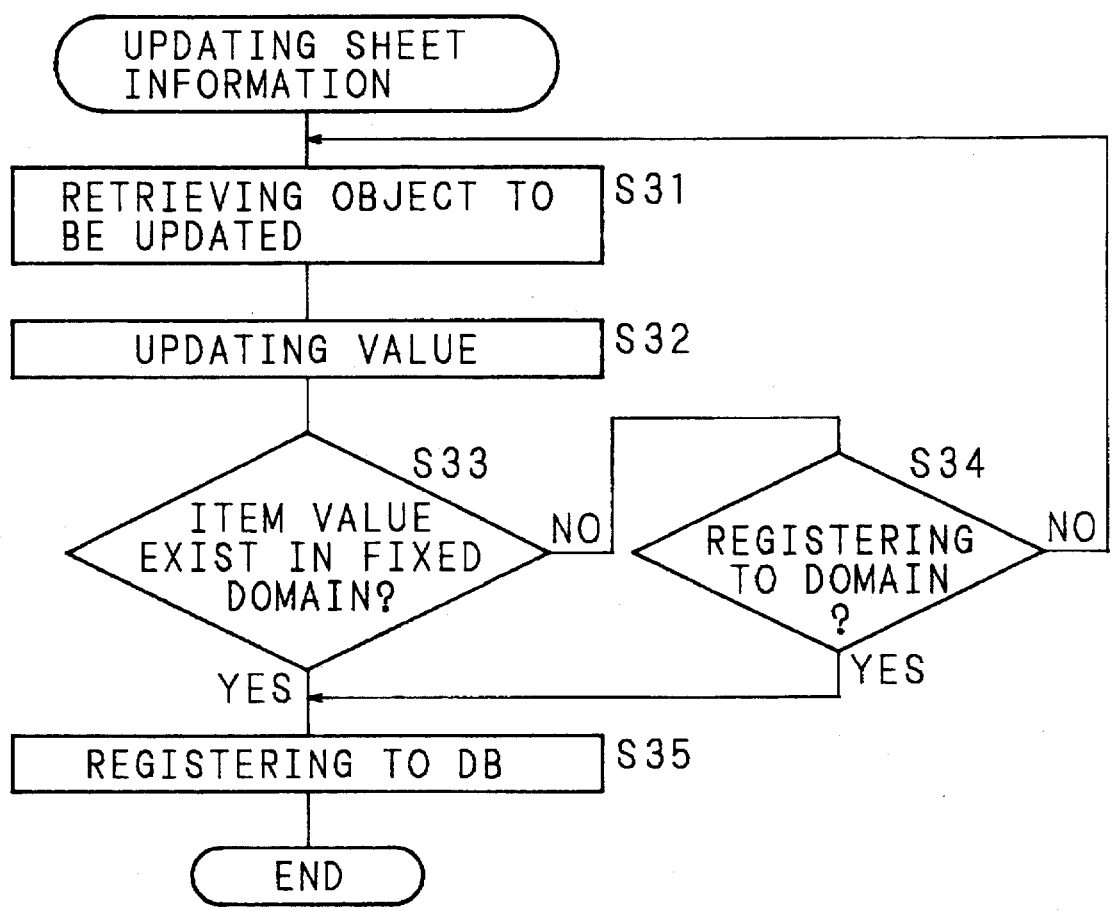
FIG. 37 is a flowchart showing procedure of updating process of sheet information.

The content of each sheet thus registered can be, of course, updated later. FIG. 37 is a flowchart showing such procedure for updating the sheet information. First, the screen for input of domain sheet appears, and the operator specifies number or value to search the updating object (step S31). In the searched sheet, the operator updates the value, and instructs registration again (step S32). Consequently, it is checked whether the newly inputted value is present in the existing domain or not (step S33), and when present, that is, when YES at step S33, it is registered in the database (step S35). When NO at step S33, whether to register in the domain or not is inquired to the operator (step S34). When the operator instructs registration again, it is registered intact in the database (step S35), and when the operator does not instruct registration, the process returns to step S32.

Figure 38:
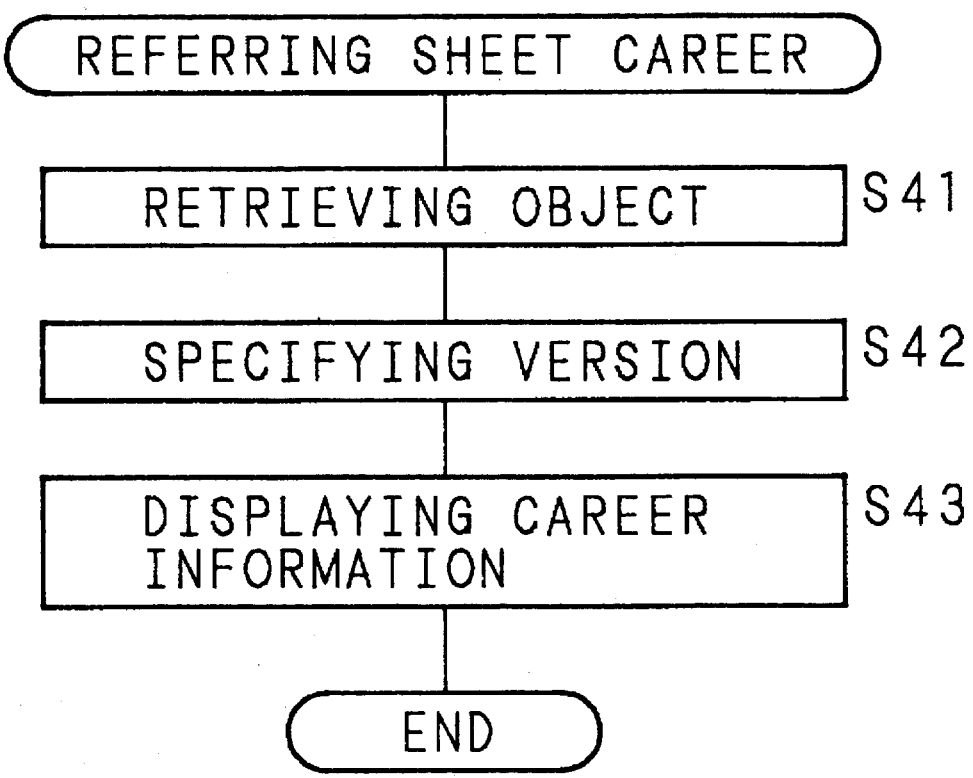
FIG. 38 is a flowchart showing procedure of history reference process of sheet information.
Figure 39:
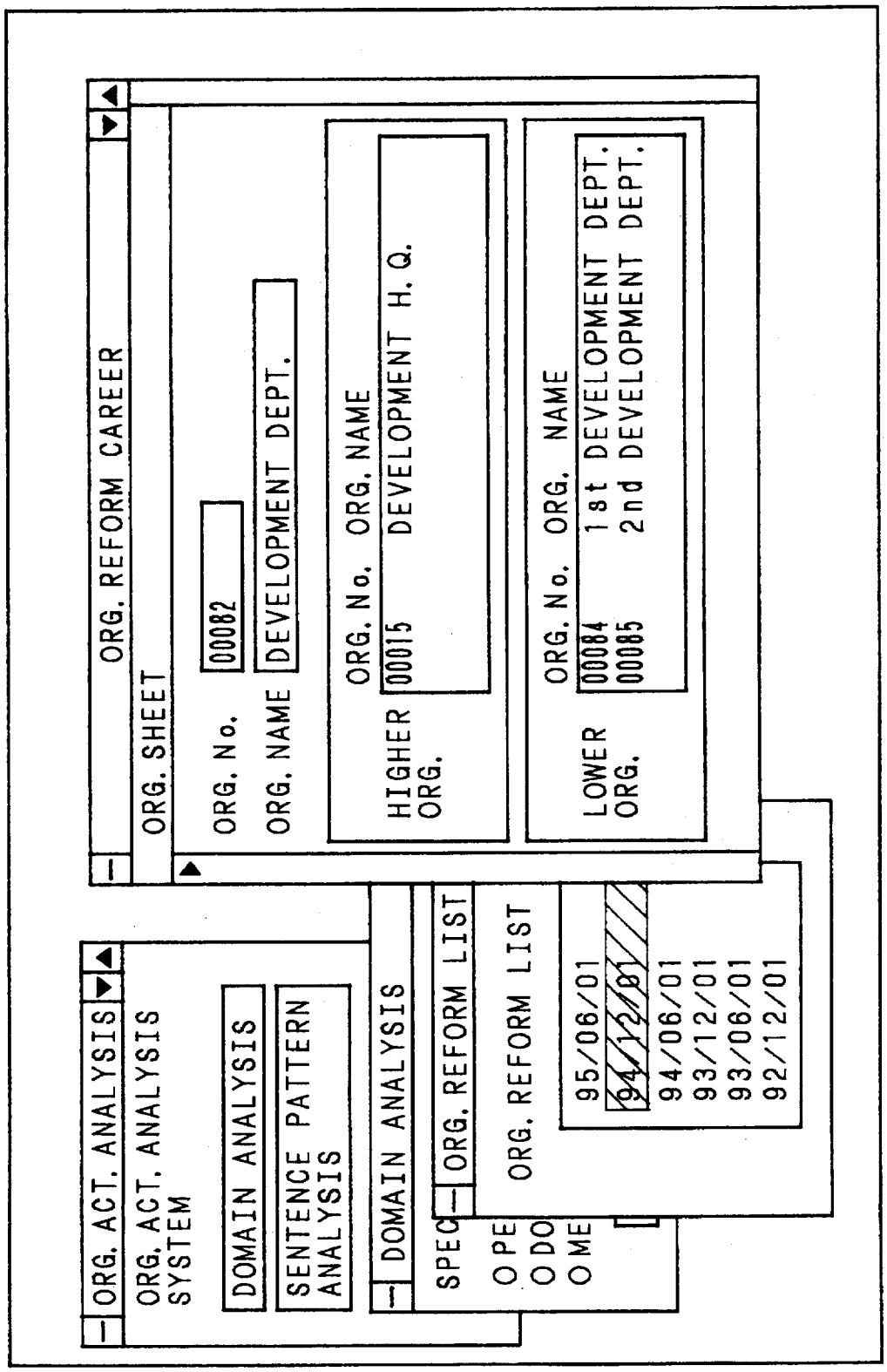
FIG. 39 is a schematic diagram showing an example of display screen by the system of the invention.

In this way, the content of each sheet is often updated, and it is also possible to refer to the update history. FIG. 38 is a flowchart showing the procedure for referring to the history of each sheet, and FIG. 39 is a schematic diagram of display screen of the terminal 5. First, the screen for input of domain sheet is displayed, and the operator specifies number or value to search the reference object (step S41). When the searched sheet is displayed at the terminal 5, the history list appears at the same time as shown in FIG. 39. When the operator specifies any history (the date of update, or version) in the history list (step S42), the sheet of the corresponding version is displayed as shown in FIG. 39.

For example, when it is specified that "the person making a business trip should present a settling statement" in the collected shop rules, the domain analysis is conducted on the "person making a business trip" as a lower concept of the person and the "settling statement" as a further lower concept of the slip which is a lower concept of document, and the sentence pattern analysis is conducted on "present" to specify the corresponding sentence pattern in the action sheet as the concept of action. In this case, the name of "the person making a business trip" can be specified as the person who presented the settling statement, and can be fitted to the data described in the person sheet mentioned above. The same applies to the "settling statement".

The phase for integrating the concepts summarized by these two analyses (F2-1, F2-2) is the third phase F3 for making the logical model. In the third phase F3, a logical model as shown in the schematic diagram in FIG. 40 is created. The created logical model is verified at this stage, and when contradiction is discovered, the real model is reviewed (1), or the process goes back to the phase of domain analysis (2-1) and sentence pattern analysis (2-1). For example, as a result of sentence pattern analysis, a document "settling statement" has been entered instead of "the presenting person", "settling statement" is not registered in the lower concept of document, or "settling" statement" is not registered in the "slip" as the lower concept of document.

It is the fourth phase F4 for creating a mounted model that is the operation to convert the verified logical model (3) into a descriptive form suited to a specified DBMS (database management system). Moreover, the mounted model is evaluated from the viewpoints of execution performance and resource performance of hardware, and, when necessary, the fifth phase F5 is executed for optimizing. These phases are not characteristic processes of the invention, but are essential processes for constructing the database or constructing the computer system.

Through the above process, the OODB (object-oriented database) of the invention considering the work flow is constructed.

So far are described the constructing method of database of the invention, more specifically, the data modeling technique of the object-oriented database (OODB), and the analysis sheets used therein, and below is explained the organization activity management system using thus constructed OODB. In the following embodiments, application examples in the pharmaceutical manufacturing industry are explained. More specifically, incorporating the events considering the work management, shop rules, statutory regulations (GCP: Good Clinical Practice) and others in research and development of pharmaceutical, various data generated in the process are registered in the OODB. The organization activity management system of the invention is constructed as a system capable of grasping the work situation from the physical aspect, searching the next process, performing other so-called work flow management, and searching the information of related organization, documents and persons.

Figure 41:
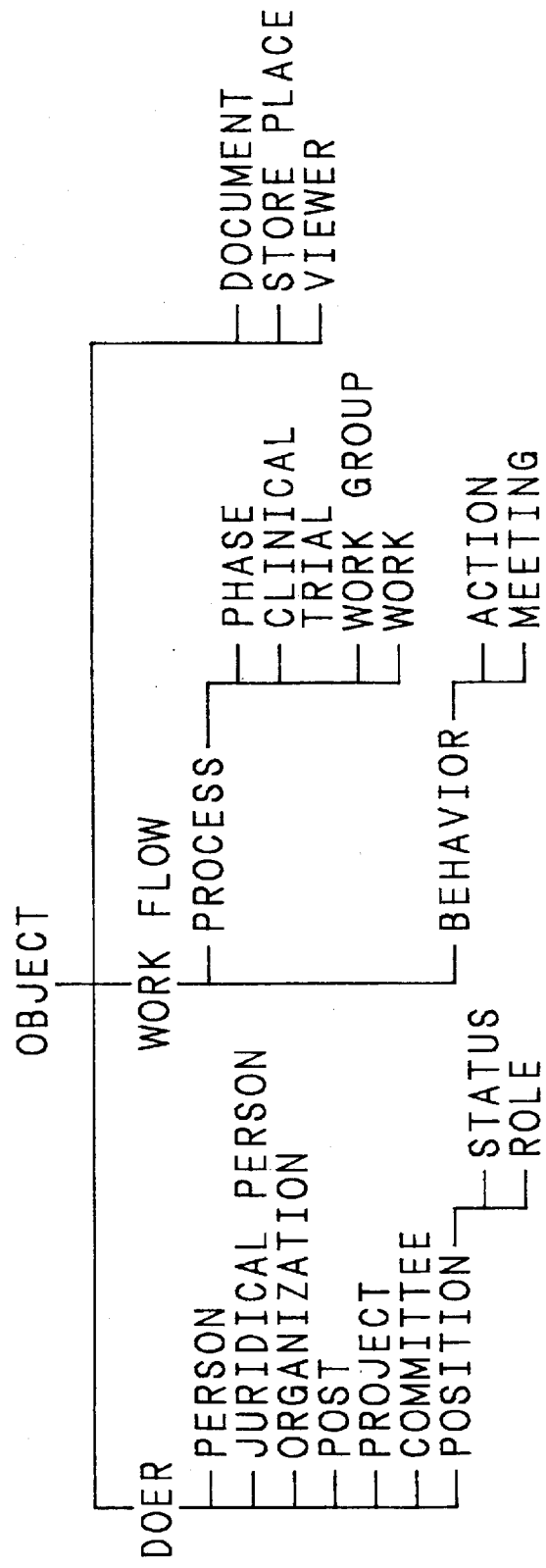
FIG. 41 is a schematic diagram showing a model of object-oriented database.

FIG. 41 is a schematic diagram showing a base of object-oriented database by the above data modeling technique. As mentioned above, the basic concepts of activity resources in the organization are person, article, capital and information. When modeling these concepts, the capital is considered to be what is produced as a result of some action by persons. Therefore, as the framework of basic model, the target region is understood as the relation of persons, articles, capital, information, and action of persons.

In organization activity, meanwhile, work of person is done on the organization, and it is modeled by stratifying in the sequence of juridical person, organization, section as node of organization, dynamic and organization-wide project, committee, post (position, role, etc.), and others. In other words, a man is related with the organization through his role.

On the other hand, the work side model is made by employing the network used in the project management, and stratifying roughly in the sequence of phase, clinical trial, working group, and work.

Furthermore, by relating various documents with the work flow, it is possible to retrieve from other standpoints than the structure of the document itself, such as job flow.

Figure 42:
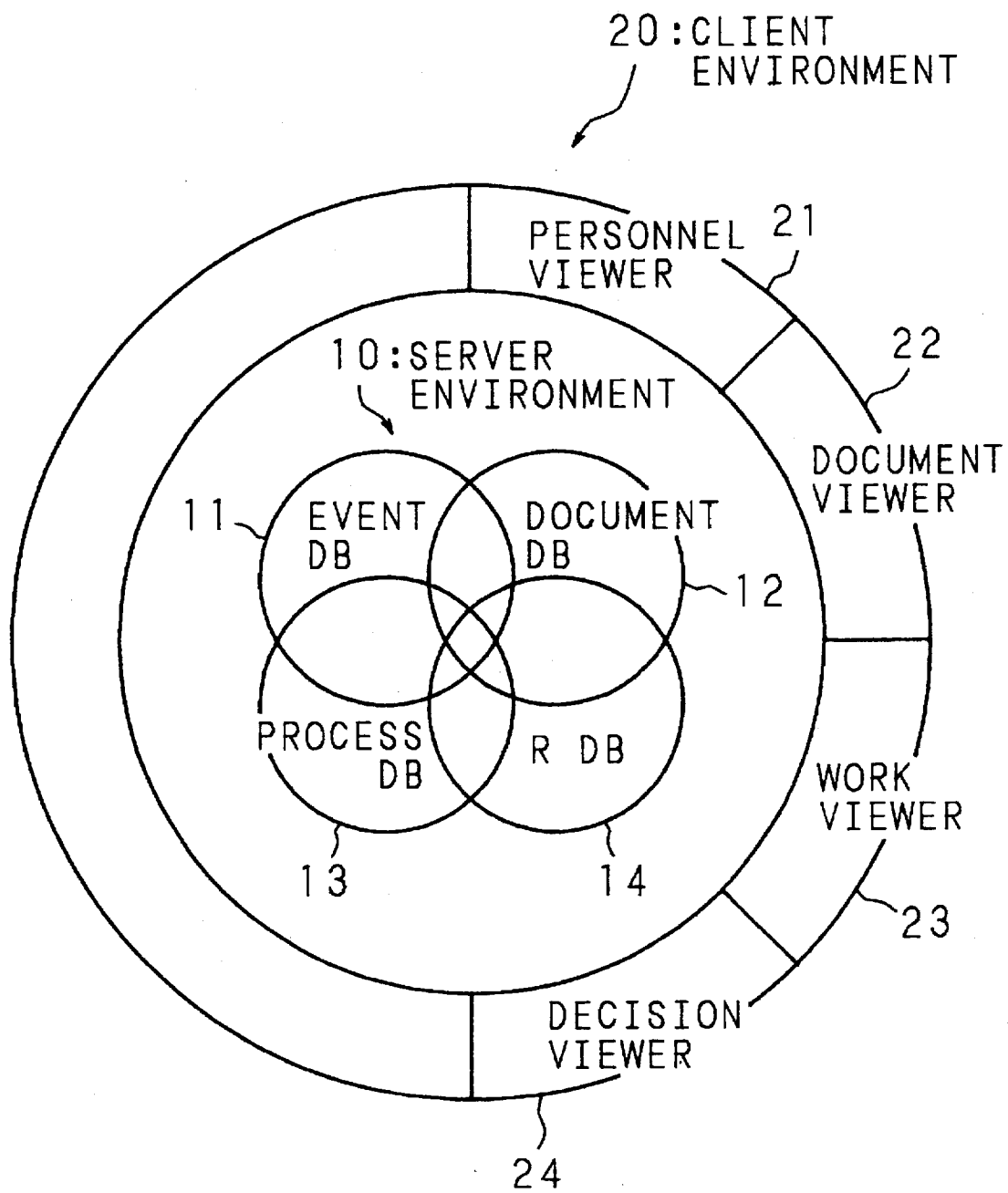
FIG. 42 is a schematic functional block diagram showing a general concept of organization activity management system of the invention.

FIG. 42 is a schematic functional block diagram showing the general concept of the organization activity management system of the invention. In FIG. 42, reference numeral 10 denotes server environment, mainly comprising database functions such as event database (DB) 11 dealing with events, document database (DB) 12 dealing with documents, and process database (DB) 13 dealing with process (schedule), and existing RDB 14. The event database 11, document database 12, and process database 13 are composed of the OODB constructed by the data modeling technique of the invention.

Reference numeral 20 represent client environments, which may be used mainly when the operator searches the event database 11, document database 12, and process database 13. For example, when the operator wants to see the information about the personnel, by entering a word expressing the concept of any stratum relating to the person out of the basic concepts of person, organization, article, document, meeting and event, and actions from the client environments 20 side, the server environment 10 can be accessed and searched, so that a personnel viewer (personal retrieval function) 21 functions. Similarly, by entering a word expressing the concept of any stratum relating to documents from the client environments 20 side, a document viewer (document retrieval function) 22 functions, and by entering a word expressing the function of any stratum relating to the work from the client environments 20 side, a work viewer (work retrieval function) 23 functions, and thus various retrieval functions are provided. That is, the client environments 20 are composed so that the database functions may be retrieved by using the lower concepts of the seven basic concepts of person, organization, article, document, meeting and event, and actions as retrieval keys.

Figure 43:
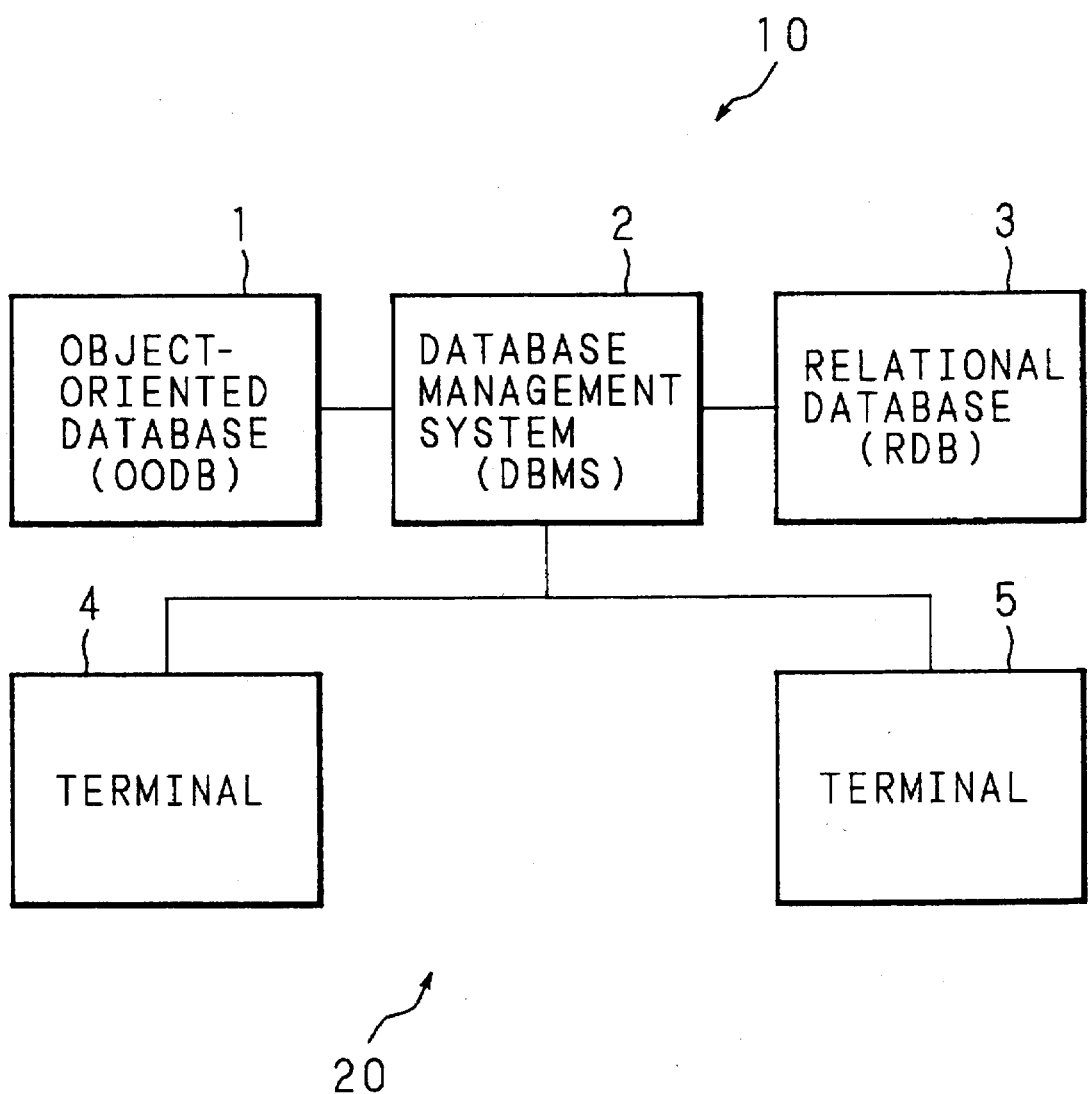
FIG. 43 is a block diagram showing hardware configuration of organization activity management system of the invention.

As the hardware, the organization activity management system of the invention is composed like an ordinary computer system as shown in a block diagram in FIG. 43. In FIG. 43, reference numerals 1, 2 and 3 respectively represent the OODB, DBMS (database management system), and RDB (relational database) as the server environment 10, and reference numerals 4 and 5 both represent the terminals as the client environments 20. The terminal 4 is the hardware introducing the computer software for realizing the development environments for programmer, and the terminal 5, for realizing the operation environments for end user, that is, the personnel viewer 21, document viewer 22, work viewer 23, decision viewer 24 and other viewer functions as shown in FIG. 42.

The operation of the organization activity management system of the invention is described below by referring to a schematic diagram showing an example of screen displayed in the terminal 5.

Figure 44:
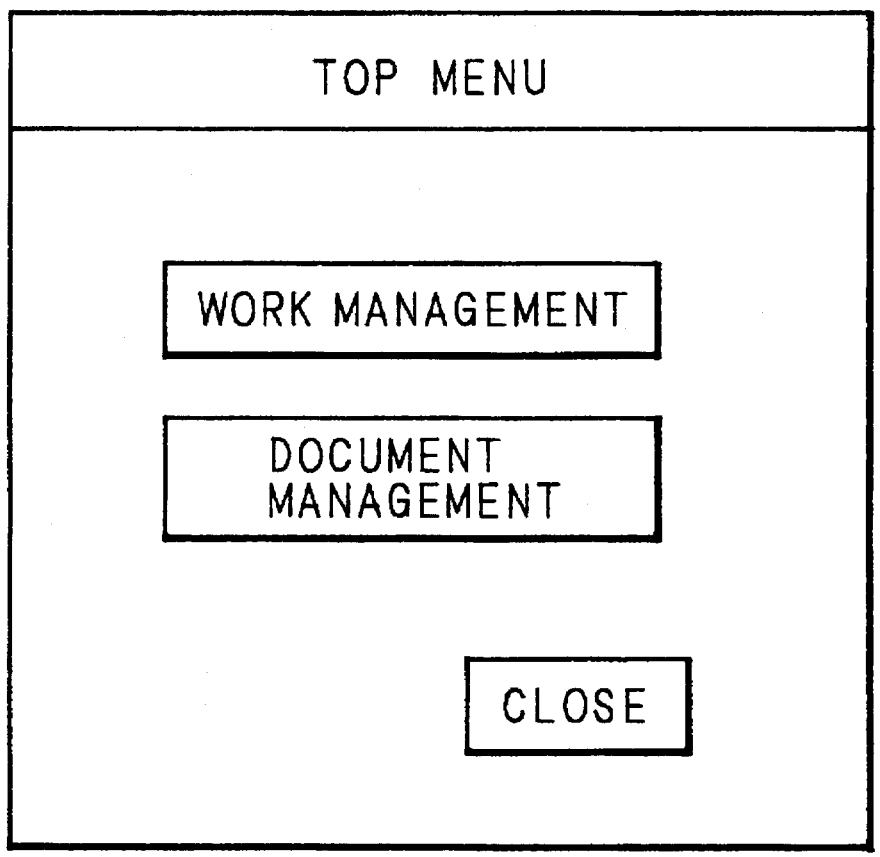
FIG. 44 is a schematic diagram showing an example of display screen by the system of the invention.

FIG. 44 is a schematic diagram of a top menu, in which the work management and document management can be retrieved, for the sake of convenience. On this screen, for example, when the operator selects and clicks "work management" on the screen, the work viewer 23 starts and the condition specifying screen as shown in FIG. 45 appears.

The screen shown in FIG. 45 displays conditions stratified in the sequence of "theme name", "clinical trial name", "work group name", and "work name". The "theme name" corresponds to the phase shown in FIG. 27. The system of the invention is characterized by capability of retrieval from the concept or fragmentary knowledge, and when not having correct knowledge about each condition, the condition can be set by displaying a list of conditions sequentially from the higher stratum. Of course, when the operator has correct knowledge of each condition, it can be directly specified.

Figure 46:
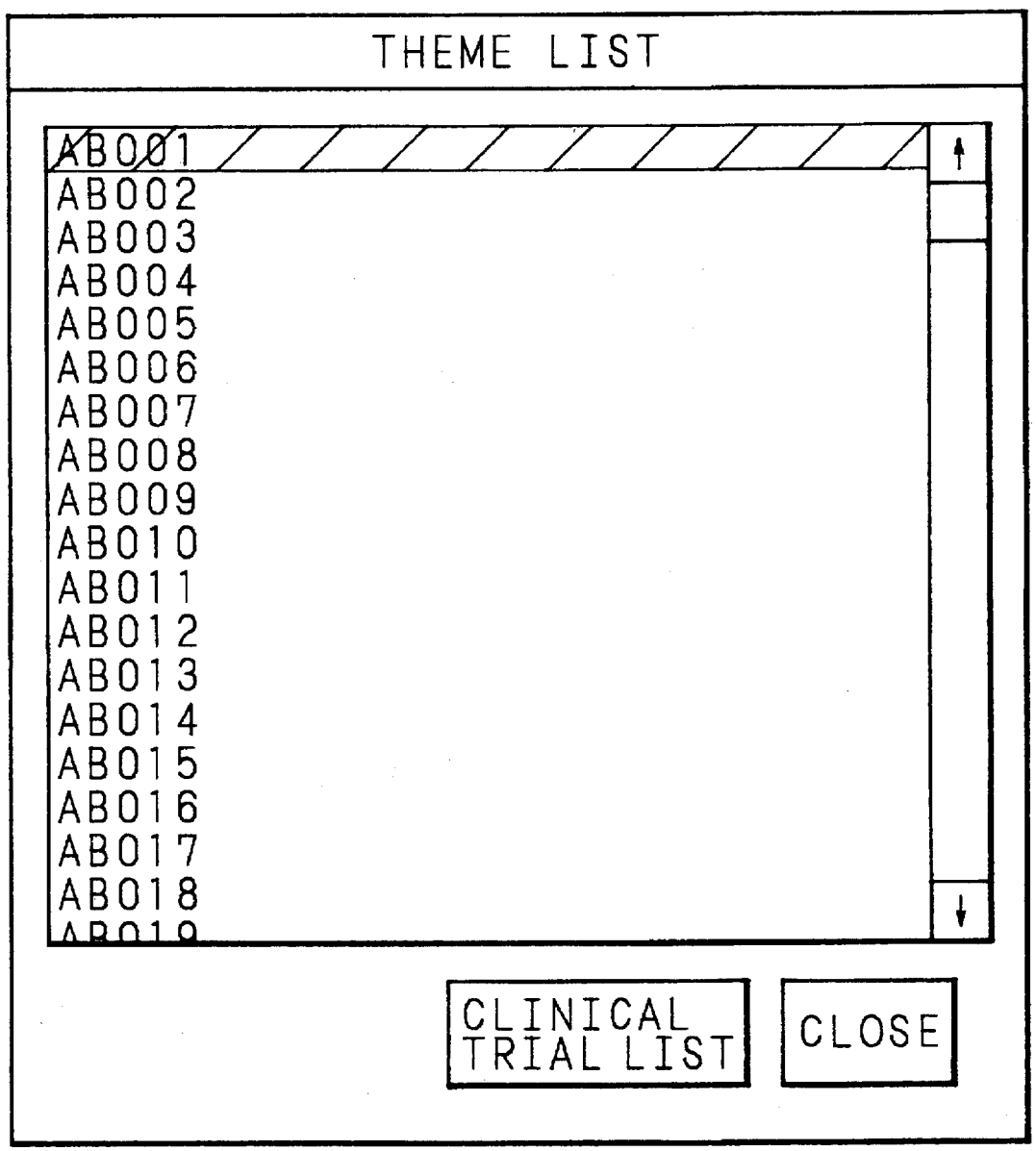
FIG. 46 is a schematic diagram showing an example of display screen by the system of the invention.

For example, when the operator selects and clicks the "theme name" which is the condition of the highest position among the conditions displayed on the screen in FIG. 45, the event database 11 is accessed, and the theme list screen is displayed as shown in FIG. 46. From this list screen, when the operator selects and clicks any one, for example, the theme of "AB001", the concept of the lower stratum is clinical trial, and when all clinical trials conducted in the same theme are shown in the list of clinical trials in FIG. 47.

Consequently, among the clinical trials registered in the theme of AB001, when the operator selects and clicks, for example, "injection agent clinical third phase trial" (DBT), the concept of the next lower concept of the clinical trial is the work group, and hence all work groups included in the clinical trial are listed up on the screen of the work group list in FIG. 48.

Among the work groups included in the clinical trial of "injection agent clinical third phase trial" (DBT), when the operator selects and clicks, for example, "clinical trial report presenting", the concept of the next lower stratum of the work group is the work, and all works included in the work group are displayed on the screen as work list as shown in FIG. 49.

Herein, among the works included in the work group of "clinical trial report presenting", when the operator selects and clicks, for example, "making of clinical trial plan", the operator has specified all conditions necessary for obtaining the information of the final purpose. In this state, when the operator operates as specified, "AB001", "injection agent clinical third phase trial (DBT)", "clinical trial report presenting", and "making of clinical trial report" are specified respectively as the conditions of "theme name", "clinical trial name", "work group name", and "work name", and hence the existence of the corresponding information such as work progress table and educational material is displayed as shown in FIG. 50.

Figure 51:
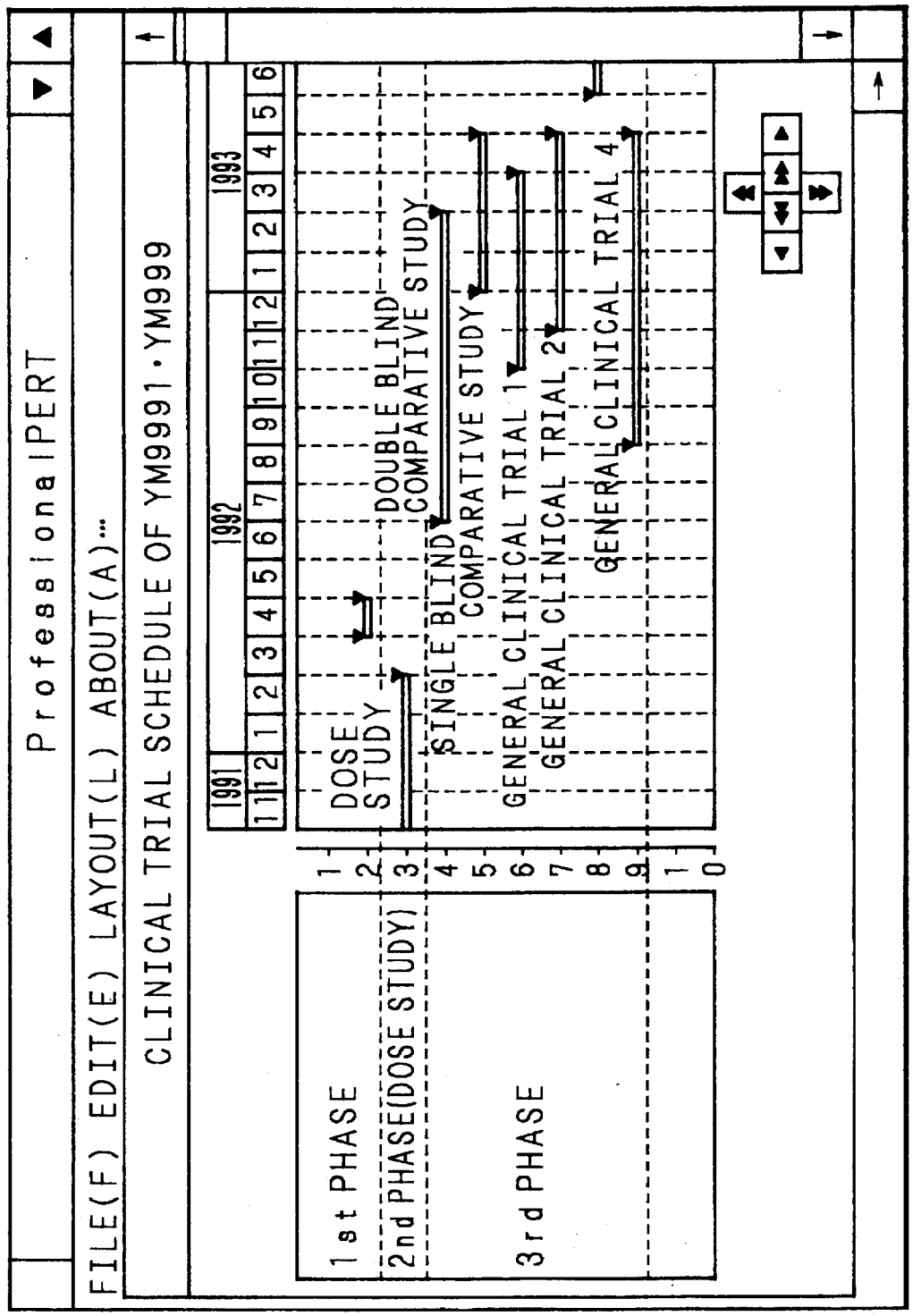
FIG. 51 is a schematic diagram showing an example of display screen by the system of the invention.
Figure 52:
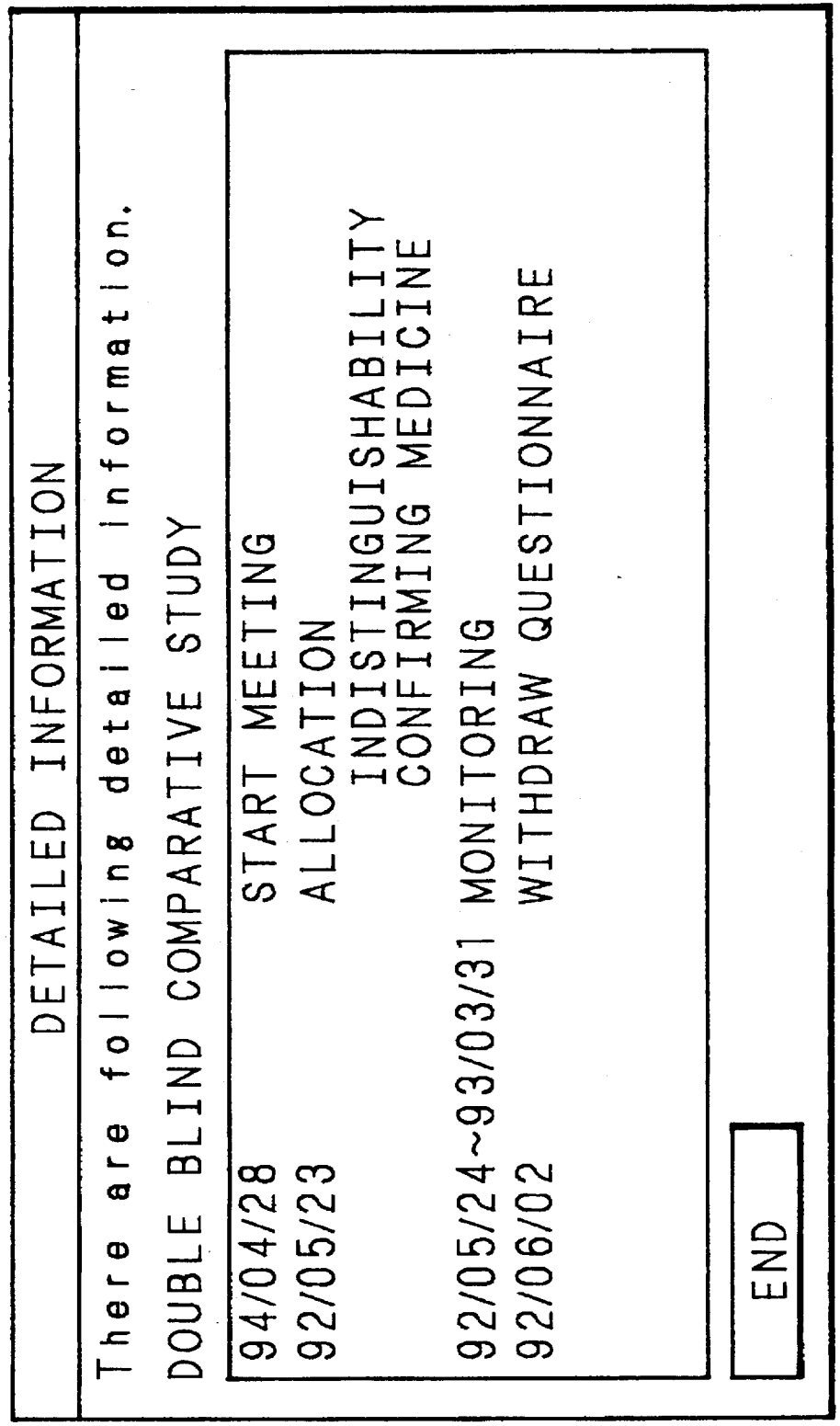
FIG. 52 is a schematic diagram showing an example of display screen by the system of the invention.
Figure 59:
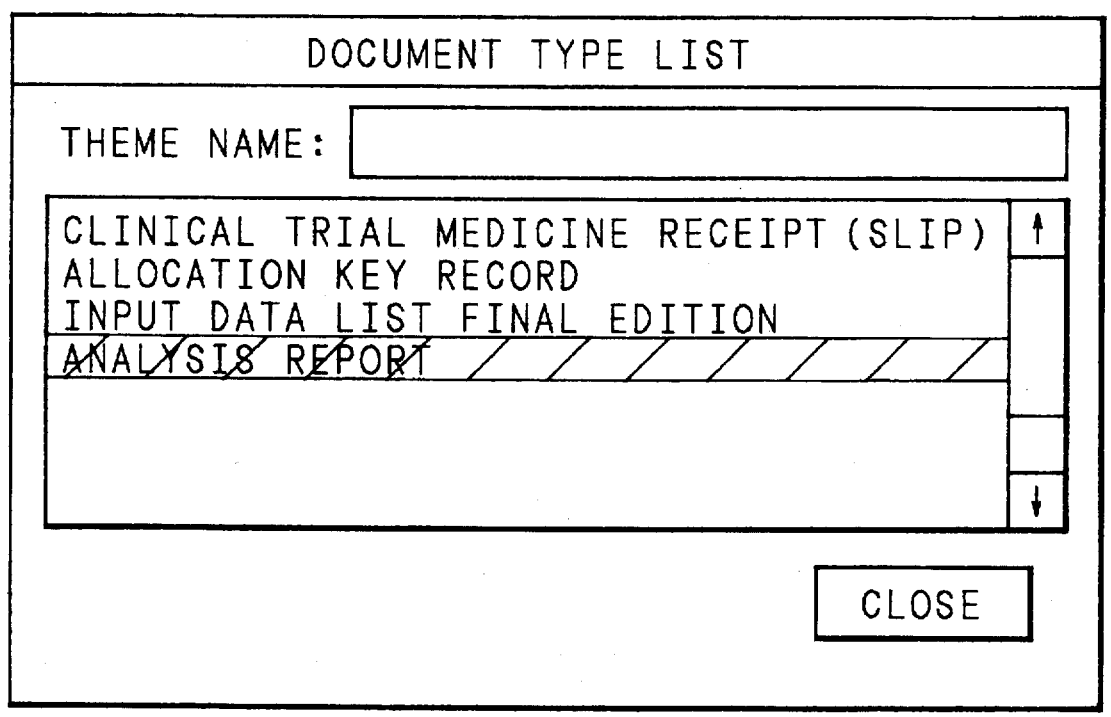
FIG. 59 is a schematic diagram showing an example of display screen by the system of the invention.

Herein, when the operator wants to see the entire process of the clinical trial of the theme "AB001", by clicking and selecting the "work progress" (network diagram), the network diagram of the entire process is displayed as shown in FIG. 51, and when the operator further selects and clicks the "double blind comparative study" among the list, the related detailed information is displayed as shown in FIG. 52.

Figure 50:
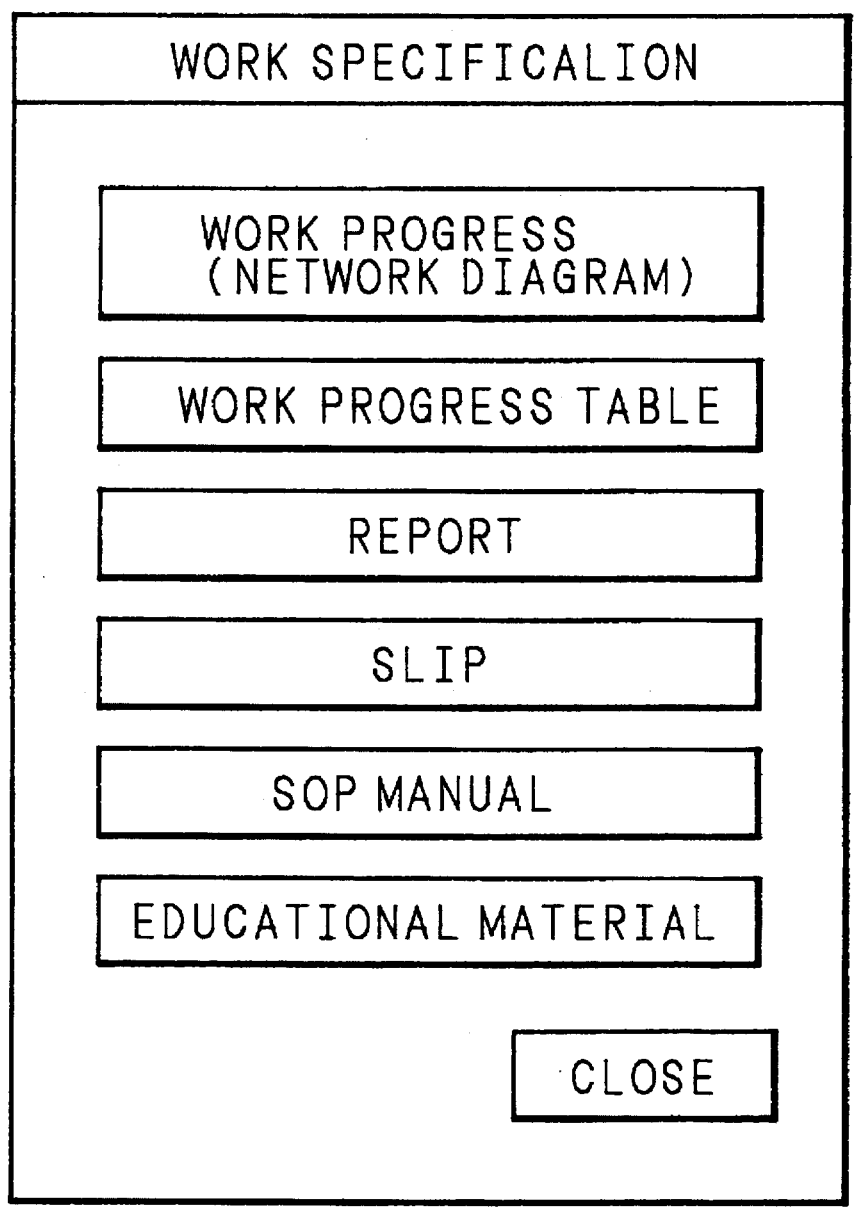
FIG. 50 is a schematic diagram showing an example of display screen by the system of the invention.

Or, when the operator wants to see the "standard of operation (SOP)", back to the screen in FIG. 50, by selecting and clicking the "SOP manual", the standard of operation about the clinical trial plan is displayed as shown in FIG. 53.

In the example shown in FIG. 53, meanwhile, the standard of operation of clinical trial plan report is displayed in text data, and the sample image data of the report is displayed as the same time. That is, the system of the invention is composed as the so-sailed multimedia system capable of displaying not only the text data but also the image data (still picture in this example) at the same time.

When the operator wants to see how much the selected work is progressed at a specific moment, by selecting and clicking the "work progress list", the process database 13 is accessed, and the progress state of the work is displayed as shown in FIG. 54.

Besides, using the work viewer 23 of the client environments 20, of course, it is possible to access directly, for example, the work progress table for process management accumulated in the process database 13.

When the operator wants to see the person whose name is displayed in the screen of the work progress status shown in FIG. 54, by clicking the portion displaying the "person's name", the personnel viewer 21 accesses the server environment 10, and the personnel information of the corresponding personal name is read out from the event database 11 as shown in FIG. 56.

Also using the personnel viewer 21 of the client environments 20, of course, it is possible to research directly the personnel related data accumulated in the event database 11, that is, various data of the basic concept of men. In the event database 11, moreover, the history information is also managed, and the history information can be searched by specifying the date as shown in FIG. 56. For example, as shown in FIG. 56, by specifying Dec. 21, 1993, the version of the specified date is displayed as shown in FIG. 57.

Figure 55:
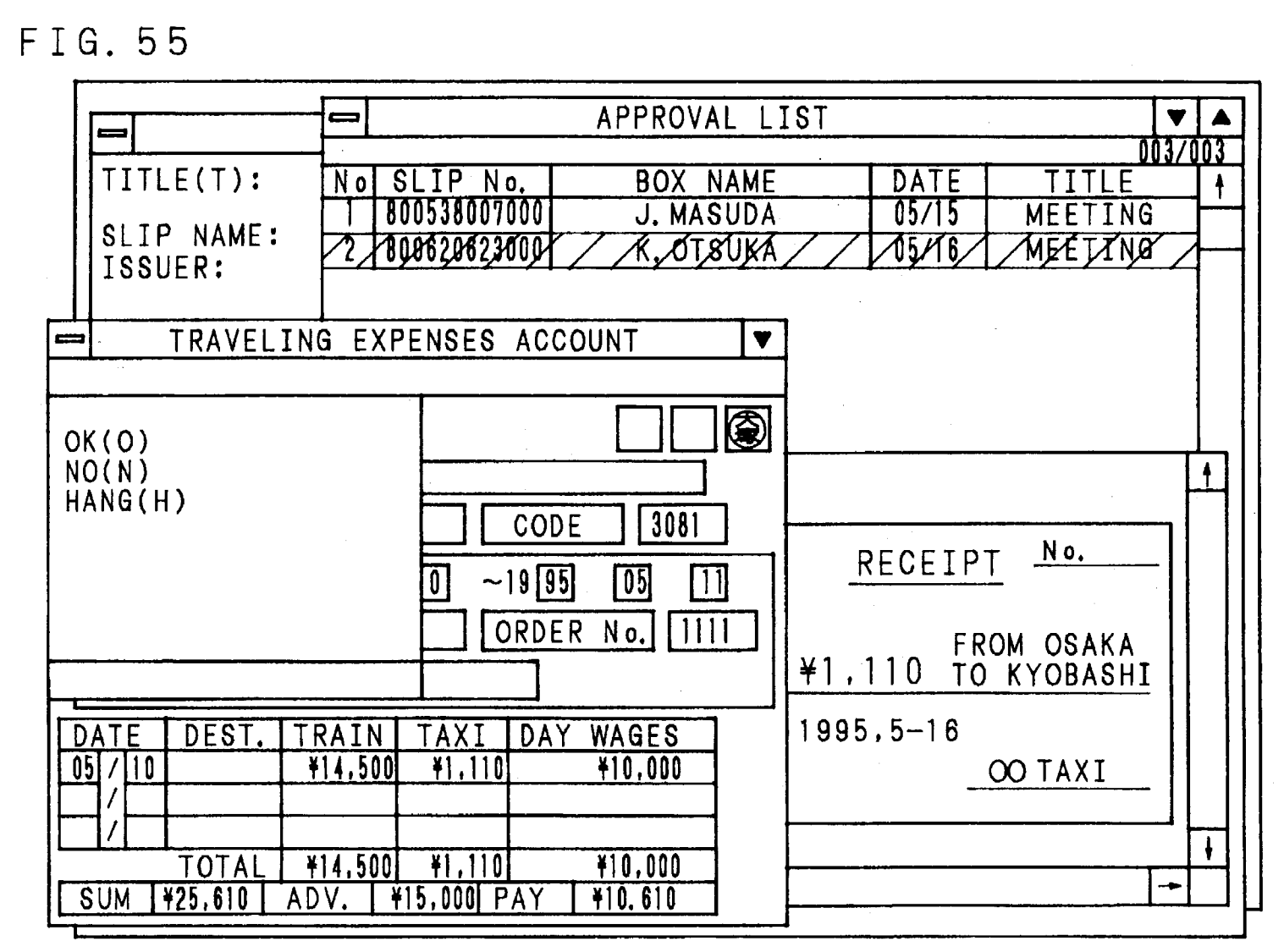

When deciding the slip occurring in the work selected at the specific point, by going back to the screen in FIG. 50 and clicking "slip", the slip deciding screen appears as shown in the schematic diagram in FIG. 55. When the operator makes necessary manipulations on this screen, the deciding is processed by EDI (Electronic Data Interchange). In the example shown in FIG. 55, the receipt as the object of the slip to be deciding is displayed as image data, and the slip itself is exchanged as electronic mail.

The document retrieval is explained. In this case, the operator selects and clicks "document management" on the top menu screen mentioned above. As a result, the document viewer 22 starts, and retrieval is enabled in any one of the three conditions, "theme", "report", and "document" type. In document retrieval, same as mentioned above, it is possible to search from concept or fragmentary knowledge, and when not having correct knowledge about each condition, the condition can be set. Of course, when the operator has correct knowledge about each condition, it can be specified directly.

In the state of display of selection screen as shown in FIG. 58, for example, when the operator selects and clicks "document type", the document database 12 is accessed, and the types of documents necessary in the process of development of new medicine are displayed. For example, when the operator selects and clicks "analysis report", actual document names registered in the document database 12 are displayed as shown in FIG. 60.

Figure 61:
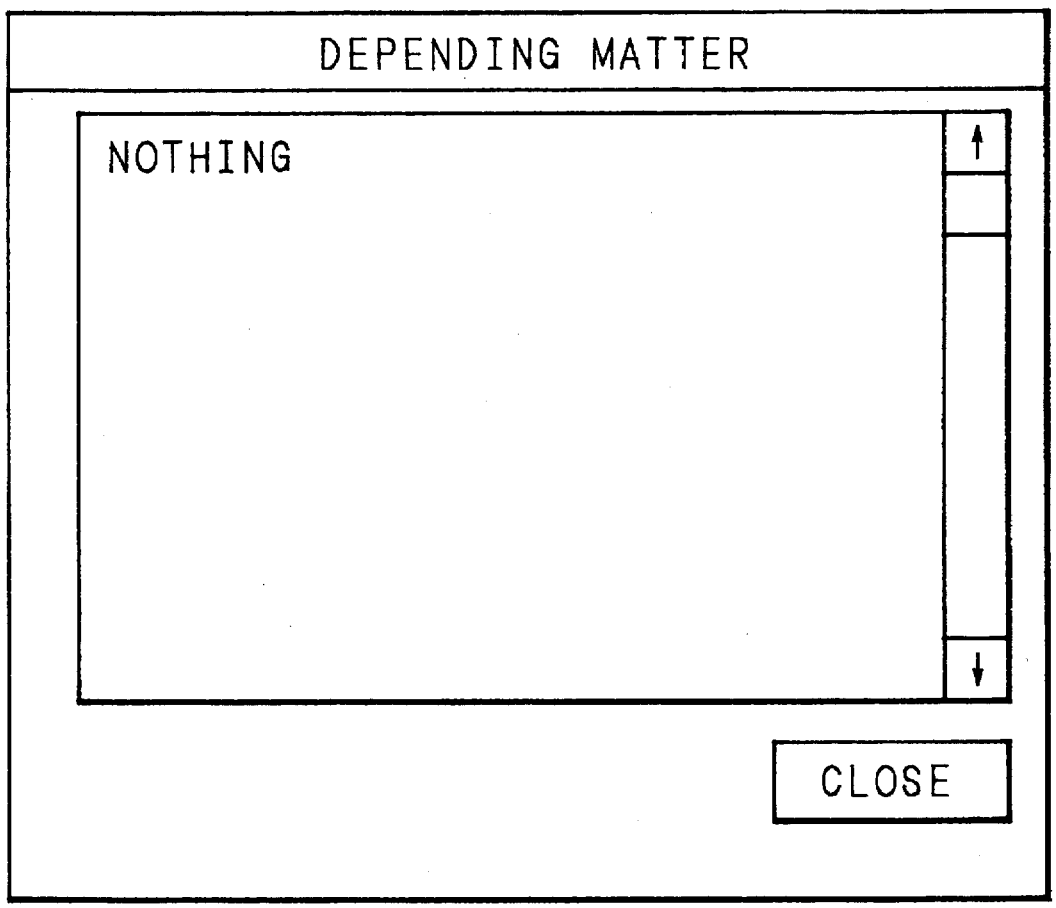
FIG. 61 is a schematic diagram showing an example of display screen by the system of the invention.

On the screen shown in FIG. 60, "document display", "pending matters", "related information reference", and others are displayed. For example, when the operator wants to see "pending matters" relating to any document in the actual documents displayed in FIG. 60, by clicking the corresponding area on the screen, it is displayed as shown in FIG. 61.

When the operator wants to know in which relation the report was made, by clicking the "related information reference" on the screen, the authors, theme and others of the document are displayed as shown in FIG. 62.

Furthermore, when the operator wants to known about the authors of the document, by clicking the author area on the screen, the event database 11 is accessed the personnel information is displayed as shown in FIG. 63.

As specifically described so far, the invention enables to integrate the management of four types of work flow necessary organization activity, that is, the management of document-oriented production work flow, document-oriented ad hoc work flow, group-oriented production work flow, and group-oriented ad hock work flow. In particular, the management of the group-oriented ad hock work flow almost ignored hitherto can be done easily.

As this invention may be embodied in several forms without departing from the spirit of essential characteristics thereof, the present embodiment is therefore illustrative and not restrictive, since the scope of the invention is defined by the appended claims rather than by the description preceding them and all changes that fall within the metes and bounds of the claims, or equivalence of such metes and bounds thereof are therefore intended to be embraced by the claims.

What is claimed is:

1. A constructing method of organization activity database, which managing the organization activity with use of a database management system operating on the hardware, comprising steps of:

for a real model in which plural concepts including concept of action handled in the organization activity are defined, defining each concept by stratifying all concepts handled in the organization activity in which plural basic concepts composing the organization activity are made to be highest stratum, and defining each sentence pattern by arranging and integrating meaning of each verb deciding a concept of action accompanying with organization activity and each example which can be taken by said verb in that meanings, and by stratifying them;

creating a logical model corresponding to said real model by fitting said defined concept to said defined sentence pattern; and making a mounted model by converting the created logical model into a descriptive system suited to said database management system.

2. A constructing method of organization activity database as set forth in claim 1, wherein said basic concepts includes at least person, organization, article, document, meeting and event.

3. An analysis sheet used for said organization activity database as set forth in claim 1, having item columns for describing the relation with lower concept with respect to said each basic concept, and item columns for describing the relation fitting each basic concept to said sentence pattern.

4. An analysis sheet as set forth in claim 3, wherein the analysis sheet is prepared corresponding to each basic concept of at least person, organization, article, document, meeting and event.

5. An organization activity management system, which managing the organization activity with use of a database management system operating on the hardware, comprising:

server environment having:

organization activity database which is constructed by, for a real model in which plural concepts including concept of action handled in the organization activity are defined, defining each concept by stratifying all concepts handled in the organization activity in which plural basic concepts composing the organization activity are made to be highest stratum, and defining each sentence pattern by arranging and integrating meaning of each verb deciding a concept of action accompanying with organization activity and each example which can be taken by said verb in that meanings, and by stratifying them; creating a logical model corresponding to said real model by fitting said defined concept to said defined sentence pattern; and making a mounted model by converting the created logical model into a descriptive system suited to said database management system;

a document database accumulating information relating to documents, a process database accumulating information of process relating to organization activity, and client environments having plural retrieval functions capable of accessing the database management system using each one of plural basic concepts, documents and processes as retrieval key of higher stratum, wherein said database management system manages said organization activity database, document database and process database by connecting each other, and said client environments are capable of accessing the information accumulated in any database in an arbitrary order by outputting the retrieval key from each retrieval function and giving to said database management system.

6. An organization activity management system as set forth in claim 5, wherein said basic concepts includes at least person, organization, article, document, meeting and event.

* * * * *